US012518397B2

(12) United States Patent
Cook et al.

(10) Patent No.: US 12,518,397 B2
(45) Date of Patent: Jan. 6, 2026

(54) AUTOMATED DETERMINATION OF A BASE ASSESSMENT FOR A POSE OR MOVEMENT

(71) Applicant: EXER Labs, Inc., Denver, CO (US)

(72) Inventors: Sean Christopher Cook, Denver, CO (US); Zaw Lynn Thet, Denver, CO (US); Clint J. Gehde, Denver, CO (US); Nicole Xiaoxuan Aw, Denver, CO (US); Daniel James Fisher, Denver, CO (US); Nicolas Arellano, Denver, CO (US)

(73) Assignee: EXER Labs, Inc., Denver, CO (US)

( * ) Notice: Subject to any disclaimer, the term of this patent is extended or adjusted under 35 U.S.C. 154(b) by 744 days.

(21) Appl. No.: 17/709,380

(22) Filed: Mar. 30, 2022

(65) Prior Publication Data
US 2022/0327714 A1    Oct. 13, 2022

Related U.S. Application Data

(60) Provisional application No. 63/169,777, filed on Apr. 1, 2021, provisional application No. 63/169,778, filed on Apr. 1, 2021.

(51) Int. Cl.
*G06T 7/20* (2017.01)
*G06T 7/70* (2017.01)
(Continued)

(52) U.S. Cl.
CPC ............. *G06T 7/20* (2013.01); *G06T 7/70* (2017.01); *G06V 20/46* (2022.01); *G06V 20/70* (2022.01);
(Continued)

(58) Field of Classification Search
CPC ... G06T 7/20; G06T 7/70; G06T 2207/20084; G06T 2207/20081; G06T 2207/30196;
(Continued)

(56) References Cited

U.S. PATENT DOCUMENTS 11,450,147 B2 *   9/2022   Mehl .......................... G06T 7/70
2019/0258851 A1   8/2019   Rajan et al.
(Continued)

FOREIGN PATENT DOCUMENTS

EP            3574828 A1      12/2019
WO    WO-2019175425 A1 *  9/2019   ......... A63B 24/0006
(Continued)

OTHER PUBLICATIONS

Chen, S, and Yang, Richard R. Pose Trainer: Correcting Exercise Posture using Pose Estimation. Jun. 21, 2020. From: < https://arxiv.org/abs/2006.11718>. (Year: 2020).*

*Primary Examiner* — Emily C Terrell
(74) *Attorney, Agent, or Firm* — Haynes Beffel & Wolfeld LLP; Andrew L. Dunlap; Paul A. Durdik

(57) ABSTRACT

The present technology provides systems, methods and computer program instructions implementing an automated technology for automated creation of movement assessments from labeled video and continually learning audio, video or other feedback for use with machine learning techniques enable program processes to learn more effective feedback mechanisms to achieve desired results (e.g., reduce errors, improve form, duration, speed, and so forth) of motions and poses comprising tasks being taught or guided. In implementations machine learning techniques enable program processes to learn more effective feedback mechanisms to achieve desired results (e.g., reduce errors, improve form, duration, speed, and so forth) of motions and poses comprising tasks being taught or guided.

20 Claims, 27 Drawing Sheets
(9 of 27 Drawing Sheet(s) Filed in Color)

(51) Int. Cl.
*G06V 20/40* (2022.01)
*G06V 20/70* (2022.01)
*G06V 40/20* (2022.01)

(52) U.S. Cl.
CPC .... *G06V 40/20* (2022.01); *G06T 2207/20084* (2013.01)

(58) Field of Classification Search
CPC .......... G06T 7/73; G06V 20/46; G06V 20/70; G06V 40/20; G06V 10/82; G06V 40/23
See application file for complete search history.

(56) References Cited

U.S. PATENT DOCUMENTS

| | | |
|---|---|---|
| 2020/0090408 A1* | 3/2020 | Virkar ................. G06V 10/764 |
| 2020/0160044 A1 | 5/2020 | Sur et al. |
| 2021/0008413 A1 | 1/2021 | Asikainen et al. |
| 2022/0262010 A1* | 8/2022 | Shpuza ................. G06V 20/46 |
| 2022/0296963 A1* | 9/2022 | Belson ............... A63B 71/0622 |
| 2022/0310226 A1* | 9/2022 | Niri ........................ G16H 40/63 |
| 2023/0145048 A1* | 5/2023 | Walker ................... G06V 10/82 382/103 |
| 2024/0123288 A1* | 4/2024 | Barbalinardo ....... G06V 10/764 |
| 2024/0185544 A1* | 6/2024 | Schubert ................... G06T 5/70 |

FOREIGN PATENT DOCUMENTS

| | | | | |
|---|---|---|---|---|
| WO | WO-2020252599 A1 * | 12/2020 | ............. | G06V 20/46 |
| WO | WO-2022221685 A1 * | 10/2022 | ............. | G06V 10/82 |
| WO | WO-2023245157 A1 * | 12/2023 | ........... | G06V 40/103 |

* cited by examiner

```
'coordinates': [
        [0.9638324312355397, 0.8609600779499673],
        [0.636638435220963, 0.36672216367617727],
        [0.12872788338073107, 0.9737397381173213],
        [0.162532271397282, 0.9806974627828601],
        [0.4639627658582615, 0.3218974849147578S],
        [0.3222671279371159?, 0.60462143139302S7],
        ...
        ]

'confidence': [
        0.7024426686878468,
        0.978469409301072,
        0.877848112867277,
        0.2742942835128487,
        0.7413591482048919,
        0.3132428211919010£,
        ...
        ]
```

FIG. 5B

Encoded Human Motion Reference

Motion Encoding Row — Positions in Sequence — Audio Feedback — Danger

| | θ1 | θ2 | θ3 | ...... | | | | |
|---|---|---|---|---|---|---|---|---|
| Squat | 102 | 156 | 123 | ...... | Outside checkpoint | Deeper! | 0 | 0 |
| Squat | 45 | 174 | 23 | | Inside checkpoint | Good Job | 0 | 0 |
| Squat | 45 | 174 | 20 | | Outside checkpoint | Watch your Knees! | ! | 0 |
| Squat | 102 | 156 | 123 | | Outside checkpoint | Head Up | 0 | 0 |
| | 0 | 0 | 0 | | | | 0 | 0 |
| | 0 | 1 | 0 | | | | 0 | 0 |
| | 0 | 0 | 0 | | | | 0 | 0 |
| | 0 | 0 | 0 | | | | 0 | 0 |
| | 0 | 0 | 0 | | | | 0 | 0 |
| | 1 | 0 | 1 | | | | 0 | 0 |
| | 0 | 0 | 0 | | | | 0 | 0 |
| | 0 | 0 | 0 | | | | 0 | 0 |
| | 0 | 0 | 0 | | | | 0 | 0 |
| | 0 | 0 | 0 | | | | 0 | 0 |
| | 0 | 0 | 0 | | | | 0 | 0 |
| | 0 | 0 | 0 | | | | 1 | 0 |
| | 0 | 0 | 0 | | | | 0 | 1 |
| | 0 | 0 | 0 | | | | 0 | 0 |
| | 0 | 0 | 0 | | | | 0 | 0 |
| | 0 | 0 | 0 | | | | 0 | 0 |

| | f1_upper | f1_lower | f2_upper | f2_lower | f3_upper | f3_lower | f4_upper | f4_lower | in_checkpoint |
|---|---|---|---|---|---|---|---|---|---|
| 0 | 37.807529 | 31.513744 | 87.454028 | 85.994337 | -5.369709 | 258.639425 | 22.843872 | 99.481821 | 0 |
| 1 | 33.462397 | 32.381499 | 88.199415 | 85.831451 | -6.997473 | 249.676413 | 22.762868 | 99.312433 | 1 |
| 2 | 37.646549 | 31.146272 | 86.788342 | 85.809256 | -7.607501 | 192.099128 | 22.594796 | 99.266220 | 0 |
| 3 | 34.736345 | 31.635518 | 86.866897 | 85.866690 | -6.744744 | 274.284982 | 22.427212 | 99.599940 | 0 |
| 4 | 35.313985 | 31.985234 | 87.546953 | 85.847695 | -4.405462 | 136.372367 | 22.509915 | 99.192137 | 0 |
| ... | : | : | : | : | : | : | : | : | : |
| 995 | 35.035885 | 31.551618 | 88.773141 | 85.543874 | -8.406590 | 150.837669 | 22.644453 | 99.866593 | 1 |
| 996 | 32.496273 | 32.204220 | 87.389772 | 85.751694 | -10.824351 | 132.054682 | 22.845299 | 99.885844 | 0 |
| 997 | 33.917318 | 32.642749 | 86.859497 | 85.802385 | -4.709685 | 260.912411 | 22.584492 | 99.261009 | 0 |
| 998 | 37.580747 | 32.314146 | 87.766427 | 85.618062 | -6.957556 | 191.748314 | 22.828462 | 99.726120 | 0 |
| 999 | 34.041836 | 31.646079 | 87.228284 | 85.783186 | -11.181092 | 162.192218 | 22.486865 | 99.286210 | 0 |

```
X_train, X_test, y_train, y_test = train_test_split(X, y, test_size = 0.33)
clf = make_pipeline(StandardScaler(), SVC())
clf.fit(X_train, y_train.ravel())
predicted = clf.predict(X_test)
accuracy_score(y_test, predicted)
```
1412

```
parameters = [{'svc__kernel':('linear', 'rbf'), 'svc__gamma': ('scale', 'auto'), 'svc__C':[1, 10, 100]}]
pipeline = make_pipeline(StandardScaler(), SVC())
clf = GridSearchCV(estimator=pipeline, param_grid=parameters, return_train_score=True, verbose=0)
clf.fit(X_train, y_train.ravel())
clf.get_params()
predicted = clf.predict(X_test)
accuracy_score(y_test, predicted)
```
1422

AUTOMATED DETERMINATION OF A BASE ASSESSMENT FOR A POSE OR MOVEMENT

RELATED APPLICATIONS

This application claims priority under 35 U.S.C. § 119(e) to: (i) U.S. Provisional Patent Application No. 63/169,777, entitled "Motion Engine" filed on Apr. 1, 2021 and (ii) U.S. Provisional Patent Application No. 63/169,778, entitled "Continually Learning Audio Feedback Engine" filed on Apr. 1, 2021, which applications are incorporated herein in their entirety by reference for all purposes.

INCORPORATIONS

X. Zhang, X. Zhou, M. Lin, and J. Sun, "ShuffleNet: An Extremely Efficient Convolutional Neural Network for Mobile Devices," in arXiv:1707.01083, 2017;

A. G. Howard, M. Zhu, B. Chen, D. Kalenichenko, W. Wang, T. Weyand, M. Andreetto, and H. Adam, "Mobilenets: Efficient Convolutional Neural Networks for Mobile Vision Applications," in arXiv:1704.04861, 2017;

M. Sandler, A. Howard, M. Zhu, A. Zhmoginov, and L. Chen, "MobileNetV2: Inverted Residuals and Linear Bottlenecks," in arXiv:1801.04381v3, 2018;

Z. Qin, Z. Zhang, X. Chen, and Y. Peng, "FD-MobileNet: Improved MobileNet with a Fast Downsampling Strategy," in arXiv:1802.03750, 2018;

K. He, X. Zhang, S. Ren, and J. Sun, "Deep Residual Learning for Image Recognition," in Proc. of CVPR, 2016;

K. He, X. Zhang, S. Ren, and J. Sun, "DEEP RESIDUAL LEARNING FOR IMAGE RECOGNITION," arXiv: 1512.03385, 2015;

J. Wu, "INTRODUCTION TO CONVOLUTIONAL NEURAL NETWORKS," Nanjing University, 2017;

I. J. Goodfellow, D. Warde-Farley, M. Mirza, A. Courville, and Y. Bengio, "CONVOLUTIONAL NETWORKS," Deep Learning, MIT Press, 2016;

F. Yu and V. Koltun, "MULTI-SCALE CONTEXT AGGREGATION BY DILATED CONVOLUTIONS," arXiv: 1511.07122, 2016;

R. K. Srivastava, K. Greff, and J. Schmidhuber, "HIGHWAY NETWORKS," arXiv: 1505.00387, 2015;

G. Huang, Z. Liu, L. van der Maaten and K. Q. Weinberger, "DENSELY CONNECTED CONVOLUTIONAL NETWORKS," arXiv:1608.06993, 2017;

C. Szegedy, W. Liu, Y. Jia, P. Sermanet, S. Reed, D. Anguelov, D. Erhan, V. Vanhoucke, and A. Rabinovich, "GOING DEEPER WITH CONVOLUTIONS," arXiv: 1409.4842, 2014;

S. Ioffe and C. Szegedy, "BATCH NORMALIZATION: ACCELERATING DEEP NETWORK TRAINING BY REDUCING INTERNAL COVARIATE SHIFT," arXiv: 1502.03167, 2015;

Srivastava, Nitish, Hinton, Geoffrey, Krizhevsky, Alex, Sutskever, Ilya, and Salakhutdinov, Ruslan, "DROPOUT: A SIMPLE WAY TO PREVENT NEURAL NETWORKS FROM OVERFITTING," The Journal of Machine Learning Research, 15 (1):1929-1958, 2014;

L. C. Piqueras, "AUTOREGRESSIVE MODEL BASED ON A DEEP CONVOLUTIONAL NEURAL NETWORK FOR AUDIO GENERATION," Tampere University of Technology, 2016;

J. Gu, Z. Wang, J. Kuen, L. Ma, A. Shahroudy, B. Shuai, T. Liu, X. Wang, and G. Wang, "RECENT ADVANCES IN CONVOLUTIONAL NEURAL NETWORKS," arXiv: 1512.07108, 2017;

M. Lin, Q. Chen, and S. Yan, "Network in Network," in Proc. of ICLR, 2014;

L. Sifre, "Rigid-motion Scattering for Image Classification, Ph.D. thesis, 2014;

L. Sifre and S. Mallat, "Rotation, Scaling and Deformation Invariant Scattering for Texture Discrimination," in Proc. of CVPR, 2013;

F. Chollet, "Xception: Deep Learning with Depthwise Separable Convolutions," in Proc. of CVPR, 2017;

S. Xie, R. Girshick, P. Dollár, Z. Tu, and K. He, "Aggregated Residual Transformations for Deep Neural Networks," in Proc. of CVPR, 2017;

F. Chaubard, R. Mundra, and R. Socher, "CS 224D: DEEP LEARNING FOR NLP, LECTURE NOTES: PART I," 2015;

F. Chaubard, R. Mundra, and R. Socher, "CS 224D: DEEP LEARNING FOR NLP, LECTURE NOTES: PART II," 2015;

F. Chaubard, R. Mundra, and R. Socher, "CS 224D: DEEP LEARNING FOR NLP, LECTURE NOTES: PART III," 2015;

F. Chaubard, R. Mundra, and R. Socher, "CS 224D: DEEP LEARNING FOR NLP, LECTURE NOTES: PART IV," 2015;

F. Chaubard, R. Mundra, and R. Socher, "CS 224D: DEEP LEARNING FOR NLP, LECTURE NOTES: PART V," 2015;

A. van den Oord, S. Dieleman, H. Zen, K. Simonyan, O. Vinyals, A. Graves, N. Kalchbrenner, A. Senior, and K. Kavukcuoglu, "WAVENET: A GENERATIVE MODEL FOR RAW AUDIO," arXiv:1609.03499, 2016; and S. Ö. Arik, M. Chrzanowski, A. Coates, G. Diamos, A. Gibiansky, Y. Kang, X. Li, J. Miller, A. Ng, J. Raiman, S. Sengupta and M. Shoeybi, "DEEP VOICE: REAL-TIME NEURAL TEXT-TO-SPEECH," arXiv:1702.07825, 2017.

REFERENCE TO COMPUTER PROGRAM LISTING APPENDIX

A Rules Engine Listing Appendix submitted electronically via EFS-Web in pdf format accompanies this application and is incorporated by reference. The name of the PDF file is "V7_Plank_App_Dialog_Engine_Rules_Appx," created on 9 Feb. 2021 and is forty-five (45) pages.

TECHNICAL FIELD

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to using deep neural networks such as convolutional neural networks (CNNs) and fully-connected neural networks (FCNNs) for analyzing data and particularly to continually learning movement analysis in implementations implementing feedback.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Motion capture technologies enable a variety of uses in motion picture animation, video game production and the like. However, diagnostic techniques based upon motion capture have been more elusive in realizing commercial practicality. The simple variability in correct performance of movements and indeed in actor's sizes and body types makes effectively evaluating motions captured in images problematic. Limitations on the processing power and capabilities of computing machinery configured to address these types of applications makes conventional approaches commercially impracticable.

Accordingly, an opportunity arises to introduce new methods and systems to evaluate motion captured from images and determine root causes of failure analysis during human execution of captured motions from images.

SUMMARY

The present technology provides systems, methods and computer program instructions implementing an automated technology for automated creation of movement assessments from labeled video and continually learning audio, video or other feedback. In implementations machine learning techniques enable program processes to learn more effective feedback mechanisms to achieve desired results (e.g., reduce errors, improve form, duration, speed, and so forth) of motions and poses comprising tasks being taught or guided.

In an aspect of the present technology a method of automated determination of a base assessment for a pose or movement includes performing video analysis, including: obtaining a manifest and corresponding recorded videos of individuals performing particular movements in proper states ("correct form") and in improper states ("incorrect form"); extracting portions of the videos for evaluation, while maintaining the descriptions from the manifest for the frames of the extracted portions of the videos; and inputting, into a pose estimation neural network, the extracted portions of the videos one frame at a time. The method further includes receiving, as an output of the pose estimation neural network and for each input frame, a pose comprising a collection of the keypoints in the frame, the keypoints corresponding to body parts, including (i) coordinates of one or more keypoints in the frame and (ii) confidences for each keypoint representing a probability that a keypoint is a particular feature of each of a body portion subject to evaluation. The method further includes outputting labeled payloads of poses and confidences for each frame of the extracted portions of the videos, wherein the labeled payload indicates (i) whether the video slice depicts a body that is in a correct form or an incorrect form, (ii) keypoint information and (iii) confidence information.

The method further includes performing movement analysis using results of the video analysis, including identifying a selection of a particular movement to train, a video associated with the particular movement and a corresponding manifest; examining the corresponding manifest to identify candidate body features and automatically selecting from the candidate body features, relevant body features to serve as keypoints. For each pose and confidence in the labeled payloads, extracting the relevant body features; using the manifest, extracting checkpoints comprising the relevant body features across one or more input videos; determining for each of the relevant body features identified, a relevant range of values; and providing recommendations including ranges for relevant body features that are acceptable for a particular movement, thereby enabling a model to be fit to the movements in the video within the relevant range of values.

The method includes performing model fitting using results of the movement analysis to determine keypoints and body features relevant to classifying a pose as correct form or incorrect form, including: performing body feature extraction for a video using the poses and confidences obtained. For each labelled checkpoint, whether the pose at the checkpoint is proper or improper is estimated; and whenever checkpoints were mislabeled in an estimate that the pose at the checkpoint is improper, an iterative machine learning process is applied to adjust ranges of the body features until each checkpoint is identified properly, thereby resulting in the estimate matching the manifest. The method further includes storing a base assessment for the particular movement in a database once the poses at all of the checkpoints are identified correctly, wherein the base assessment includes identified baselines for best case scenarios for each pose/movement.

In another aspect of the present technology, video analysis can further include labeling a payload indicating (i) that a particular frame includes a particular pose, and poses of each keypoint, (ii) confidences of each keypoints, and (iii) an aggregate of confidences over multiple keypoints for a particular repetition of a movement in the task.

In further aspect of the present technology, video analysis can also include using one or more confidences to weight some keypoints assigned to joints, thereby enabling confidences of a first keypoint associated with a first joint permeate through labeling of other keypoints associated with other joints and across collections of frames. For example, body features are selected from a set of at least a neck length, a shoulder angle, and a knee angle.

In a yet further aspect of the present technology, model fitting can also include rerunning the performing body feature extraction after a range is changed; determining whether the change improved or degraded overall accuracy based upon at least whether number of mislabeled checkpoints increased or decreased; and adjusting ranges until all checkpoints are identified correctly.

In implementations, videos that are self-created are labelled whereas videos received from other sources may or may not be labelled.

In a still further aspect of the present technology, the manifest describes frames of each video as being at least one of (i) proper, reflecting that an individual is in a proper state, and (ii) improper, reflecting that an individual is in an improper state.

In a still yet further aspects of the present technology, the manifest describes the frames of each video as (i) being a start of a repetition, (ii) being an end of a repetition, (iii) including specific keypoints to be evaluated and (iv) including a working side to be evaluated. The keypoints to be evaluated are associated with at least one of a set comprising head, shoulder elbow, knee, foot, any other body feature.

In yet still further aspects of the present technology, the manifest identifies a plurality of peak checkpoints to be evaluated per repetition as an individual's body moves through repetitions, during a repetition the individual's body moves through a series of these checkpoints. The peak check points can include at least one of a set comprising an initial checkpoint and a motion-peak checkpoint. The motion-peak check is a stopping point in a motion. (e.g., bottom of a squat motion). A checkpoint can comprise a set of keypoints in a known state as a body moves through a series of checkpoints throughout a repetition. The keypoints in a squat include a bottom of squat, certain angles of knees, an angle formed by shoulders, an angle formed at a waist.

In a still further aspect of the present technology, customization of the payload can be performed using an automated method including receiving from a coach user, adjustments to determined features using a web GUI; determining, by a customization engine, a difference between baseline values and a coach user's version of the base assessment determined using the adjustments as received; extracting from labeled video poses and confidences a set of features, comparing the labeled video poses and confidences against new values determined using the adjustments as received, thereby determining a difference between adjusted values and the baseline. If a range is determined to no longer identify movement checkpoints, reporting an error alerting that a modified value would not meet the checkpoint in the baseline and providing the coach user an opportunity to re-adjust the values and retry. If it is found that all ranges can still properly identify the labeled checkpoints, the customization is finished, and a coach assessment is stored in a database for future use.

In a still further aspect of the present technology, the payload can be transmitted to a user device, the user device conducting evaluation of collected facts about performance of a task and determining output instructions for a user performing the task.

A system including one or more processors and memory accessible by the processors is also described. The memory can be loaded with computer instructions which can be executed on the processors. The computer instructions when executed on the processors can implement the method for self-disinfecting a touch surface of a touch sensitive display device. Computer program products which can be executed by computer systems are also described herein.

Other aspects and advantages of the present technology can be seen on review of the drawings, the detailed description and the claims, which follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 5B illustrates an example raw model output in an example application of the disclosed technology to conduct training using feedback and rule-based motion analysis gathered from a user session in a representative implementation.

FIG. 8 illustrates a labelling of an exemplary input training set for training a deep neural network implementation.

FIG. 14A illustrates an example iterative machine learning process such as a grid search in a representative implementation.

FIG. 14B shows use of a simple example 1412 of a C-Support Vector Classification (SVC) provided by the machine learning toolkit.

FIG. 14C shows performing a Grid Search 1422 to determine new hyperparameters for the given model (in this case an SVC).

DETAILED DESCRIPTION

Figure 1:
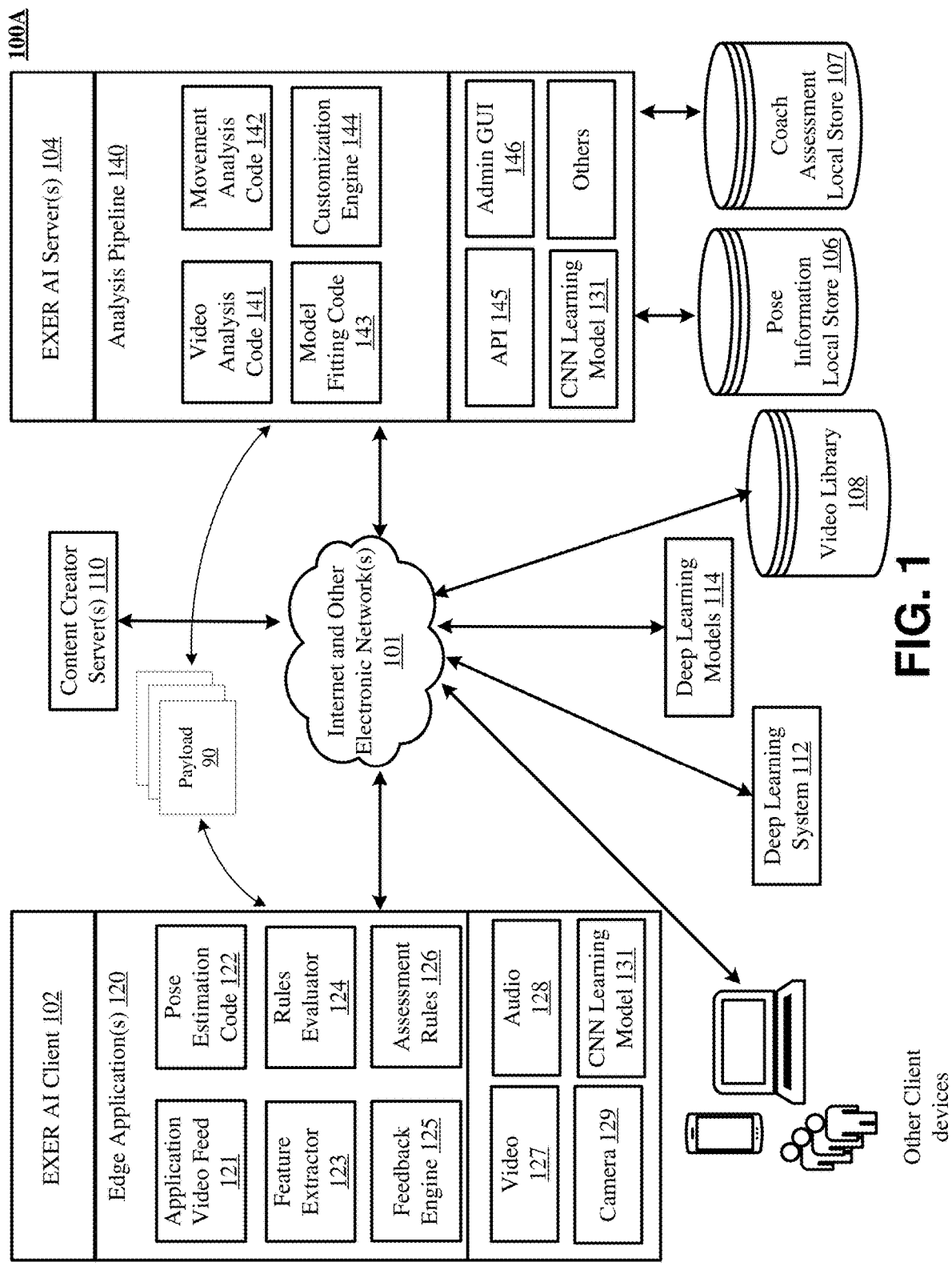
FIG. 1 illustrates a system 100A that implements content management, analysis and delivery functionality using machine learning techniques.

Aspects of the present disclosure relate to automated creation of movement assessments from labeled video and continually learning audio feedback.

Our technology addresses the problem of improving the efficiency of adding movements (e.g., exercises) for evaluation by an automated system product. Applications could include any type of specific movement (e.g., choreographed dance movements, High Intensity Interval Training (HIIT) movements, martial arts, and so forth), physical therapy applications, and kinematic uses such as gait analysis.

Each user responds to feedback differently. For example, some enjoy constant praise or corrections, while other prefer silence. Our technology enables adaptively self-configuring by the computer system to meet the needs of an individual user while still achieving a goal. Machine learning techniques can be applied to various situations where messages are sent to attempt to change outcome. Implementations include portable devices or systems in teaching or training applications.

Our technology calls for inputs of videos recorded of individuals performing movements in proper and incorrect states. These videos are labeled on a per frame basis with labels including "proper", as well as error states (e.g., "elbow out too far"). The videos are processed using a convolutional neural network trained for human pose estimation that identifies the coordinates of keypoints (e.g., "head", "right elbow") in each frame of the input videos. For each frame's identified keypoints, a collection of body features is evaluated. A body feature is a description of one or more body keypoints in relation to another keypoint or a fixed point in space.

Using the feature outputs, a pattern detection algorithm is executed on each of the video outputs to identify patterns of motion using the coordinates of each identified body part, as well as the ranges that determine a successful repetition of the exercise. Using these ranges as an initial starting point as well as the initial video outputs and other "test videos", the system then performs a statistical fitting operation to ensure that each frame of a video is labeled correctly. Once the automated process has completed, a user (coach, trainer, professional) can "tweak" the ranges subjectively to better match how they tend to coach someone who is performing the movement.

The output of the system is a payload that describes each movement's proper and error states, as well as additional boundaries as customized by the user's coach. Additionally, the payload can include error details such as coaching instructions to be displayed when an error is detected. This output is then utilized by an edge device (e.g., phone, computer, fitness hardware, etc) that processes a live video feed with a similar human pose estimation Convolutional Neural Network (CNN). The edge device runs software that interprets the same collection of body features and compares each frame's features against the payload to determine the current state of the user in relation to the expected movement.

Given the collection of current facts, a feedback engine determines an appropriate response message type, or none if none exists. For each message type, there exist many variants of audio recordings from which the system can choose. Initially, an audio output is chosen at random and is played to the user and the time at which the audio was played and the corresponding message is stored for future reference.

After evaluating facts, the Feedback Engine evaluates historical outcomes. An outcome is a consequence of the combination of facts evaluated and the message played to the user. By evaluating all previous outcomes, the time between similar outcomes can be identified. For instance, the time between two errors reported to the user can be evaluated. The system can then use machine learning approaches such as association rules and linear regression to adjust the dynamic weights of certain facts that are pre-determined to affect an outcome. These adjusted weights are then used in subsequent executions of the engine and the process continues.

When a feedback session ends, the dynamic weights are stored and can be used again for subsequent sessions of the same assessment or can be used as initial values for similar facts in other assessments.

Some implementations can reduce the processing time of analyzing video of captured motion from weeks to days. Some implementations can improve the usability and performance over the current state of the art where all messages are just played to users.

System Overview

The technology disclosed describes system and method implementations of human motion analysis using deep learning-based approaches to identify and isolate anomalies and to identify and trigger appropriate remedial actions including selection and initiation of instructional content representations. FIG. 1 shows an architectural level schematic of a system in accordance with an implementation. Because FIG. 1 is an architectural diagram, certain details are intentionally omitted to improve the clarity of the description.

The discussion of FIG. 1 will be organized as follows. First, the elements of the figure will be described, followed by their interconnections. Then, the use of the elements in the system will be described in greater detail.

FIG. 1 includes the system 100A that implements content management, analysis and delivery functionality using machine learning techniques. The system 100A includes one or more AI server(s) 104, disposed to process, manage and distribute instructional content to users at AI client devices 102. Content can be provided by content creators 110 and stored in a video library 108. Once analyzed, content can be stored in a pose information local store 106. A deep learning system 112 can be used to train one or more neural networks or other learning model(s) 114, such as for example a convolutional neural network (CNN) that can be trained using techniques described herein to recognize human poses and movements, and Internet and/or other electronic communications network(s) 101.

The interconnection of the elements of system 100A will now be described. Network(s) 101 couples the client(s) 102, the one or more servers 104, the pose information local store 106, with the other servers and other entities that comprise a content delivery network 100A, e.g., the other client devices, video library 108, content creator's server(s) 110 accessing private collections data stored for each organization, the deep learning system 112, the learning model(s) 114, and other devices not shown in FIG. 1 for clarity sake, that can be in communication with each other (indicated by solid double-arrowed lines). The actual communication path can be point-to-point over public and/or private networks comprising network(s) 101. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. At least some of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications. The engines or system components of FIG. 1, such as AI client(s) 102, AI server(s) 104, deep learning system 112, content creators' server(s) 110, and other server(s) not shown in FIG. 1 for clarity sake are implemented by software running on varying types of computing devices. Example devices are a workstation, a server, a computing cluster, a blade server, and a server farm.

AI Server(s) 104 implement an analysis pipeline 140 that takes as input video information, such as may be provided by content creators using content creator server(s) 110 and stored in video library 108, and provides as output a payload 90 comprising a manifest, assessment rules, and some introductory weights that will be used when determining what audio to play to client devices such as AI client 102. In a minimal implementation, these weights can be set to a trivial starting point (e.g., 1.0—meaning that the all audio should play when the system detects an error.) Payload 90 will also include source locations for associated audio to play to the user. This will be a mapping of error identifiers (e.g., ERROR-001 represents the state "head too high" for a plank) to a remote storage URL (e.g., AWS S3) for the audio file to play when we encounter that error. It is noteworthy that portions of payload 90 can be modified by client 102 and the modified values returned to server 104. For example, dynamic weightings in the neural network sent to the device 102 can be modified by the device 102 during usage of the neural network. These modified dynamic weightings can be sent back to the server 104, enabling the system to continue the learning process based upon collective learning during use by multiple clients in the field. Analysis pipeline 140 includes a video analysis code 141, movement analysis code 142, a model fitting code 143, and customization engine 144.

Video analysis code 141 takes as input video, such as provided by content creators using content creator server(s) 110 and stored in video library 108, for example. Input videos are accompanied by a manifest that describes each video as well as relevant timeframes in the video, such as the start and end of a repetition, relevant keypoints that should be examined during an exercise, a "working side" indicator that says what side of the body should be examined, and the number of peak checkpoints per repetition—which is typically 2—initial and peak. The video analysis code begins by extracting relevant parts of each video while maintaining the appropriate labels (e.g. "shoulder rotation", "improper form", "repetition start", and others). The videos can be fed a frame at a time into a pose estimation convolutional neural network (CNN) 131, which can be drawn from one of the deep learning models 114, that outputs a Pose (coordinates of X number of keypoints in the frame) and Confidences (the confidence of each identified keypoint). The outputs of the video analysis code stage are labeled payloads of Poses and Confidences, as well as the initial manifest describing the overall movement.

Movement analysis code 142 examines the manifest to determine a candidate list of body features to use to assess the movement. Features involving the relevant keypoints (indicated in the manifest) are automatically selected based upon a data structure associating keypoints to appropriate features. For example, if "head" is a relevant keypoint, features like "head->neck distance" and "head->shoulder angle" are selected for use in the initial analysis. Keypoint-feature data structure implementations include a linked list, a doubly linked list, search trees, tables, and the like. For each Pose and Confidence payload, the relevant features are extracted. Using the manifests, checkpoints are extracted across each input video. These lists are examined to determine relevant ranges of values for each feature. This results in a list like "checkpoint_initial", "checkpoint_repetition", and "checkpoint_[error]_state" for each video. These recommendations are output to the model fitter cod 143 along with the manifest and Poses and Confidences for each video.

Model fitting code 143 performs feature extraction upon the Poses and Confidences for an entire video. At each labeled checkpoint, the recommendations are compared to determine if they "see" the checkpoint properly, e.g., if the system is able to adequately assess the movement by evaluating the features (commonly the angle between certain keypoints) and determining if the evaluated ranges fall within those that the system learned during the previous stage, the system "sees" the checkpoint. Practically this could mean that we have trained the system to look for an elbow angle in the range of 30-36 degrees and if during this stage we see an angle of 34 degrees we can say that the system properly "sees" the checkpoint. If all checkpoints were identified correctly, the model fitting processing stage is complete. If checkpoints were mislabeled, an iterative machine learning process such as a grid search such as described below in greater detail with reference to FIG. 14A-FIG. 14C is performed to slightly adjust values for features until all checkpoints are "seen" properly. Once the model fitting is complete, the "base" assessment for the exercise is stored in a database, e.g., pose information local store 106.

Customization engine 144 enables a coach to adjust determined features in the web GUI 146 to his or her liking. The customization engine 144 will determine the difference between the base values e.g., received from the model fitting 143 and the coach's version of the assessment, as prompted for by the customization engine 144 via the admin GUI 146 and/or via API 145. The labeled video Poses and Confidences are then ran through a feature extractor and compared against the new values. If a range is determined to no longer identify movement checkpoints, and error is reported to the coach. The coach can then re-adjust the values and try again. If it's found that all ranges can still properly identify all labeled checkpoints, the customization stage is finished. A "coach" assessment is stored in a coach assessment local store 107 database for future use.

AI Client(s) 102 implement an edge application 120 that takes as input manifest comprising assessment rules 126, as may be provided by AI Server(s) 104, and implements a continually learning feedback session for the user of the AI client 102. Edge application 120 includes an application video feed code 121, pose estimation code 122, a feature extractor code 123, a rules evaluator 124, and a feedback engine 125.

Application video feed code 121 implements capture of live-stream or recorded video in color or B&W format. While embodiments can be realized in virtually any size video, one implementation presently in use employs video in 1920×1080 (landscape) and 1080×1920 (portrait) sizes), however other sizes are appropriate to various applications. Frames are scaled to appropriate size for model input, such as for example a currently implementation resizes to 224× 416 (portrait), 416×224 (landscape), however other sizes are appropriate to various applications.

Pose estimation code 122 extracts X number of keypoints that describe areas of interest on the body. For example: in one implementation, the location of a keypoint corresponding to the user's head is found to be at (x: 200, y: 300). Implementations can employ either 3D or 2D images.

Feature extractor code 123 smooths the current pose using an appropriate digital signal processing (DSP) functionality to prevent perceived jumpiness in the video image when displayed, especially when using a mobile or small footprint device. One implementation uses Kalman filters to remove jumpiness (see e.g., en DOT wikipedia DOT org/wiki/Kalman_filter; which is incorporated herein by reference in its entirety for all purposes). Another implementation uses 1 € ("One Euro") Filters as described in the paper here: dl DOT acm DOT org/doi/10.1145/2207676.2208639?cid=81100168597 which is incorporated herein by reference in its entirety for all purposes. Given the current exercise being taught, extract features from the relevant assessment rules 126.

Rules evaluator 124 implements given the current set of extracted features, comparing them to the assessment rules 126. Thus, the rules evaluator 124 is able to determine a current state of the user's pose.

Feedback engine 125 implements given the determined state, identify a message (or NULL message) to present or play for the user.

In one implementation, learning model(s) 114 implement multi-layer ensembles of neural subnetworks includes a first anomaly subnetwork, and a second solution accessibility subnetwork. The learning model(s) 114 are further configured to classify inputs indicating various anomalous sensed conditions into probabilistic anomalies using a first anomaly subnetwork. Determined probabilistic anomalies may be classified into remedial application triggers. Remedial application triggers are invoked to recommend or take actions to remediate, and/or report the anomaly. One implementation the learning model(s) 114 can select a feedback type, such as an audio feedback object, video feedback object, haptic feedback object, or other feedback object to submit based upon the situation state. For example within the exercise field, learning model(s) 114 can select whether to play an encouraging audio message responsive to a decision that the user is fatigues, or vibrate slightly to indicate a motion going awry, or the like. One implementation can select a report recipient based upon the situation state. For example within the exercise field, learning model(s) 114 can address reporting to a coach, team coach, personal trainer, physiotherapist, doctor, nurse practitioner, nurse, or other medical professional, or other third party.

The deep learning system 112 trains some of the learning model(s) 114 implementing neural networks in semi-supervised modalities to recognize anomalies in motions and trigger remedial actions. Further implementations enable learning from gathered results of remedial actions and adjusting the dynamic weightings in the neural network to continue the learning process during use in the field. In one implementation, neural networks are trained on one or more training servers (e.g., 1302 of FIG. 13) using training datasets (e.g., 1312 of FIG. 13) and deployed on one or more production servers (e.g., 1304 of FIG. 13).

The API 145 is used for communication between the client and server. Each request to the API includes a version number, which represents the version of payload that the client supports. When an assessment from the from the API is requested an Assessment Rules payload. Requests to the API can include the ability to report back range minima and maxima as seen during live processing. This data can be used to further train the model and update assessment rules.

Having reviewed FIG. 1 illustrating an example system for delivering content capable of interacting with and learning from a user, we now look at the processes conducted by the AI server 104 in more detail with reference to FIGS. 2A, 2B, 2C and 2D.

Video Analysis

Figure 2A:
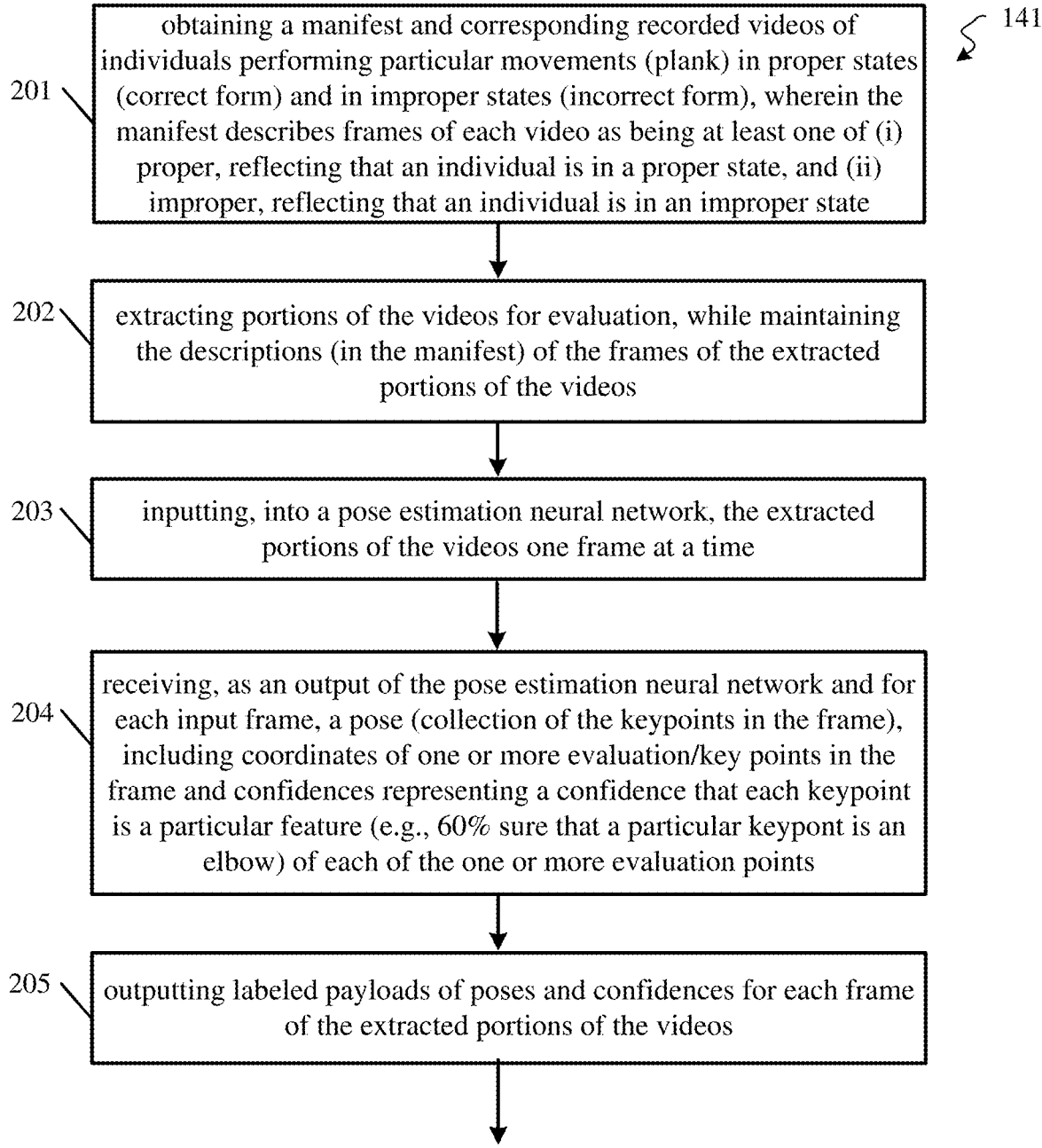
FIG. 2A illustrates a flowchart depicting an example process for performing video analysis as may be embodied by video analysis code 141 in a representative implementation.

FIG. 2A illustrates a flowchart depicting an example process for performing video analysis as may be embodied by video analysis code 141 in a representative implementation.

In block 201 process for obtaining a manifest and corresponding recorded video of individuals performing particular movements, such as a plank or the like in proper states (correct form) and in improper states (incorrect form) is illustrated. Videos are created and labeled with ground truth (e.g., correct form, incorrect form, etc.) labelling or some implementations convert/leverage/use videos found in the public domain (e.g., world wide web for example). The manifest describes frames of each video as being at least one of (i) proper, reflecting that an individual is in a proper state, and (ii) improper, reflecting that an individual is in an improper state. The manifest may further describe the frames of each video as (i) being a start of a repetition, (ii) being an end of a repetition, (iii) including specific evaluation points (head, shoulder elbow, etc.) to be evaluated and (iv) including a working side to be evaluated, wherein the manifest identifies a number of peak checkpoints to be evaluated per repetition (e.g., initial checkpoint and peak checkpoint (e.g., bottom of the squat)). As used here, the terms evaluation/keypoint are used to denote interesting features, e.g., elbow, wrist and coordinates thereof. As used herein the term checkpoint refers to a collection of keypoints in a known state, e.g., in a squat, bottom of squat, certain angles of knees, shoulders, waist, etc., as the body moves through a series of checkpoints throughout a repetition. In an implementation, automation can be included, where the computer determines some/all of the data in the manifest. In other implementations, a human's input is solicited, collected, or both. For example, a manifest could say from 2-6 seconds or 60-360 frames the user's hips are too high.

In block 202 extracting portions of the videos for evaluation, while maintaining the descriptions (in the manifest) of the frames of the extracted portions of the videos.

In block 203 inputting, into a pose estimation neural network, the extracted portions of the videos one frame at a time.

In block 204 receiving, as an output of the pose estimation neural network and for each input frame, a pose (collection of the keypoints in the frame), including coordinates of one or more evaluation/key points in the frame and confidences representing a confidence that each keypoint is a particular feature (e.g., 60% sure that a particular keypoint is an elbow) of each of the one or more evaluation points.

In block 205 outputting labeled payloads of poses and confidences for each frame of the extracted portions of the videos (e.g., this frame includes a pose of someone leaning over, poses of the keypoints and the confidences of the keypoints, then aggregate of confidences over all keypoints for a particular repetition). Confidences can also be used to weight some joints (keypoints) (e.g., confidences of elbow can permeate through labeling of other keypoints-across collections of frames). In implementations, if "labels" in the manifest could be wrong, computer implemented technology can reconcile and validate (question) the labels that were determined; thereby resulting in slices of videos comprising information about whether correct/incorrect position/state, and keypoint and confidence information.

Figure 2B:
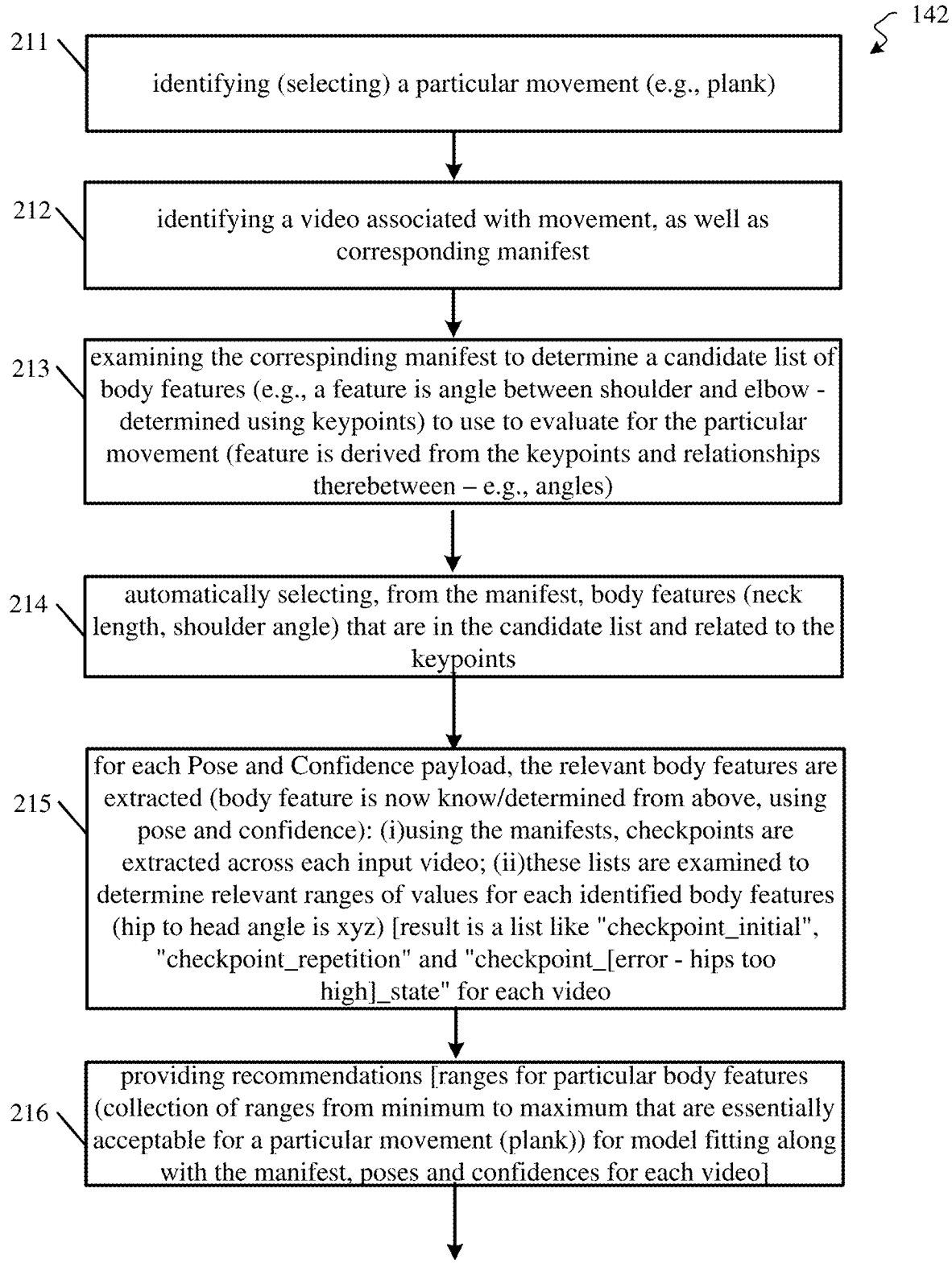
FIG. 2B illustrates a flowchart depicting an example process for performing movement analysis as may be embodied by movement analysis code 142 in a representative implementation.

Movement Analysis:

FIG. 2B illustrates a flowchart depicting an example process for performing movement analysis as may be embodied by movement analysis code 142 in a representative implementation.

In block 211 identifying (selecting) a particular movement (e.g., plank).

In block 212 identifying a video associated with movement, as well as corresponding manifest.

In block 213 examining the corresponding manifest to determine a candidate list of body features (e.g., a feature is angle between shoulder and elbow—determined using keypoints) to use to evaluate for the particular movement. The feature is derived from the keypoints and relationships therebetween e.g., angles.

In block 214 automatically selecting, from the manifest, body features (neck length, shoulder angle) that are in the candidate list and related to the keypoints.

In block 215 for each Pose and Confidence payload, the relevant body features are extracted (body feature is now know/determined from above, using pose and confidence). Using the manifests, checkpoints are extracted across each input video. These lists are examined to determine relevant ranges of values for each identified body features (hip to head angle is xyz) [result is a list like "checkpoint_initial", "checkpoint_repetition" and "checkpoint_[error—hips too high]_state" for each video.

In block 216 providing recommendations [ranges for particular body features (collection of ranges from minimum to maximum that are essentially acceptable for a particular movement (plank)) for model fitting along with the manifest, poses and confidences for each video. This is still the learning phase, the system is still learning what is acceptable and not acceptable.

Figure 2C:
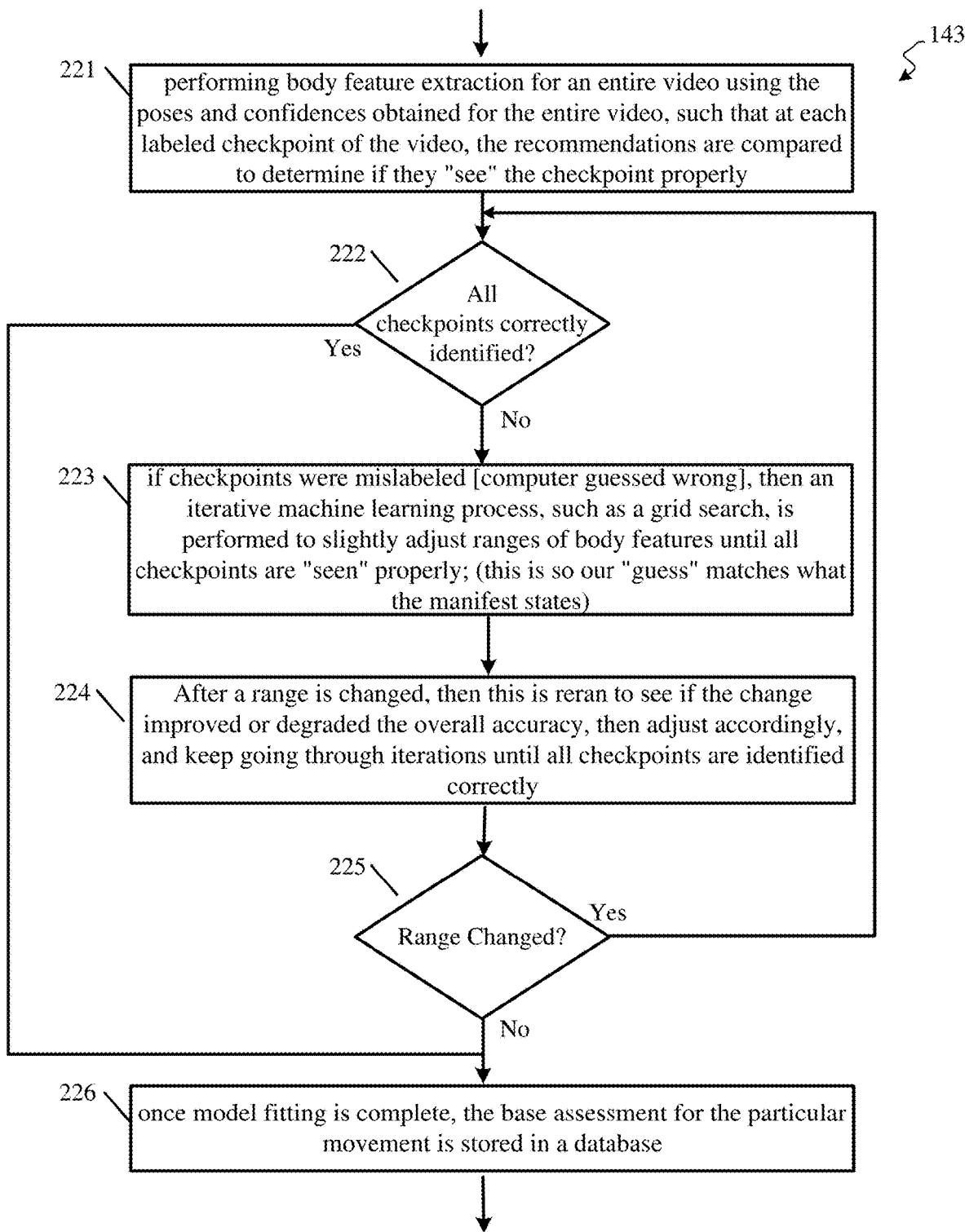
FIG. 2C illustrates a flowchart depicting an example process for performing model fitting as may be embodied by model fitting code 143 in a representative implementation.

Model Fitting:

FIG. 2C illustrates a flowchart depicting an example process for performing model fitting as may be embodied by model fitting code 143 in a representative implementation. The goal is to determine which keypoints and/or body are relevant to determining whether (e.g., plank) posture is correct. (This can remove keypoints/body features from analysis and focus on the relevant ones).

In block 221 performing body feature extraction for an entire video using the poses and confidences obtained for the entire video, such that at each labeled checkpoint of the video, the recommendations are compared to determine if they "see" the checkpoint properly (e.g., the checkpoint is properly modelled). Up to this point, we have all of the data we need to make our first guess (or estimate); for each frame the present technology enables a computer to "guess" whether the move was proper/improper.

In block 222 if all checkpoints are identified correctly, i.e., corresponds with the "guess" of the computer as to being proper or improper, then this stage is complete.

In block 223 if checkpoints were mislabeled [i.e., the computer "guessed" wrong], then an iterative machine learning process, such as a grid search, is performed to slightly adjust ranges of body features until all checkpoints are "seen" properly. (This is so our "guess" matches what the manifest states).

In block 224 and 225 after a range is changed, then this is reran to see if the change improved or degraded the overall accuracy, then adjust accordingly, and keep going through iterations until all checkpoints are identified correctly.

In block 226 once model fitting is complete, the base assessment for the particular movement is stored in a database.

Figure 2D:
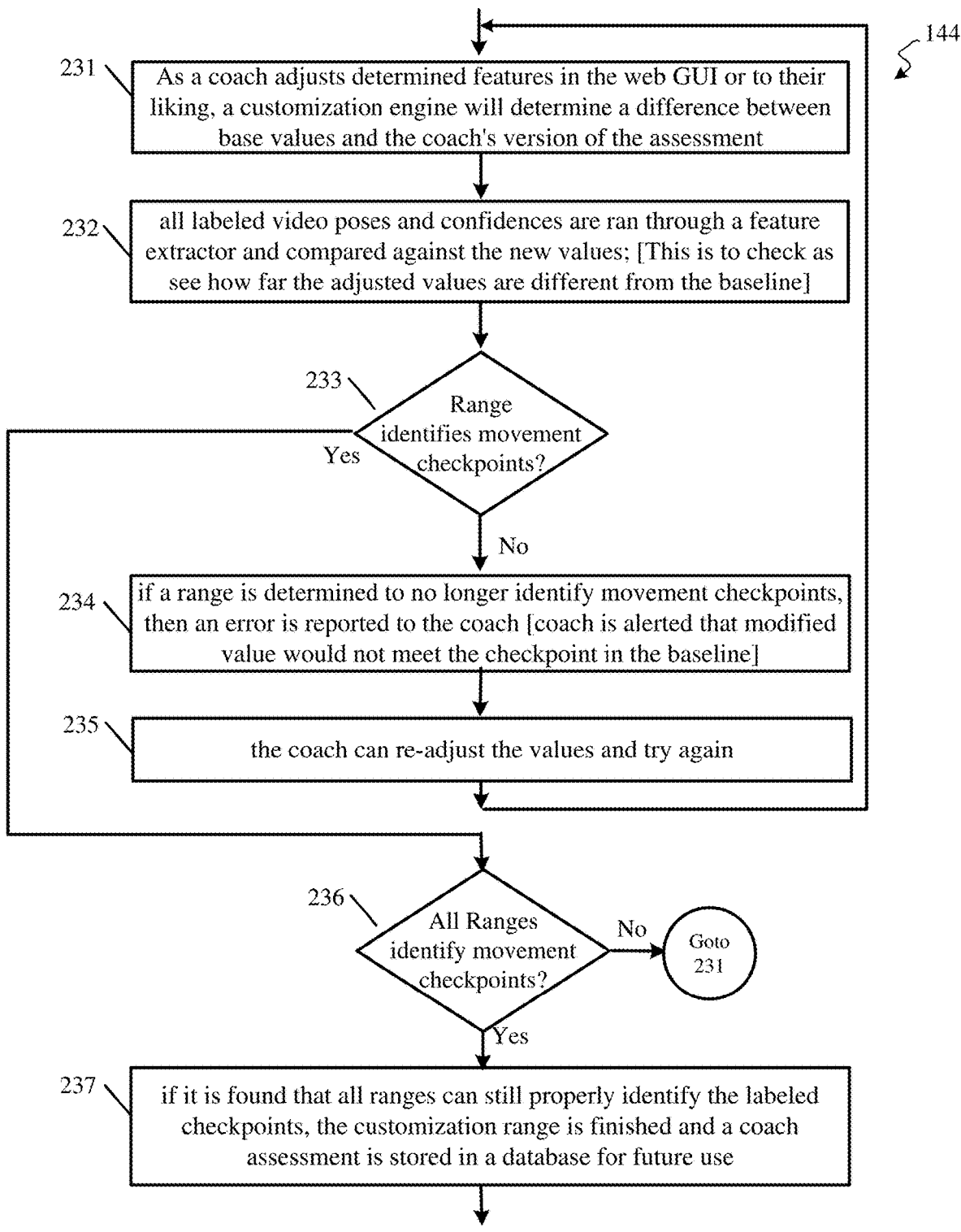
FIG. 2D illustrates a flowchart depicting an example process for performing customization as may be embodied by customization engine 144 in a representative implementation.

Customization:

FIG. 2D illustrates a flowchart depicting an example process for performing customization as may be embodied by customization engine 144 in a representative implementation. Up to now, we have identified baselines for best case scenarios for each movement.

In block 231 as a coach adjusts determined features in the web GUI or to their liking, a customization engine will determine a difference between base values and the coach's version of the assessment.

In block 232 all labeled video poses and confidences are ran through a feature extractor and compared against the new values. This is to check as see how far the adjusted values are different from the baseline.

In block 233 if a range is determined to no longer identify movement checkpoints, then in block 234 an error is reported to the coach. The coach is alerted that modified value would not meet the checkpoint in the baseline.

In block 235 the coach can re-adjust the values and try again.

In block 236 if it is found that all ranges can still properly identify the labeled checkpoints, the customization range is finished and a coach assessment is stored in a database for future use.

Figure 3A:
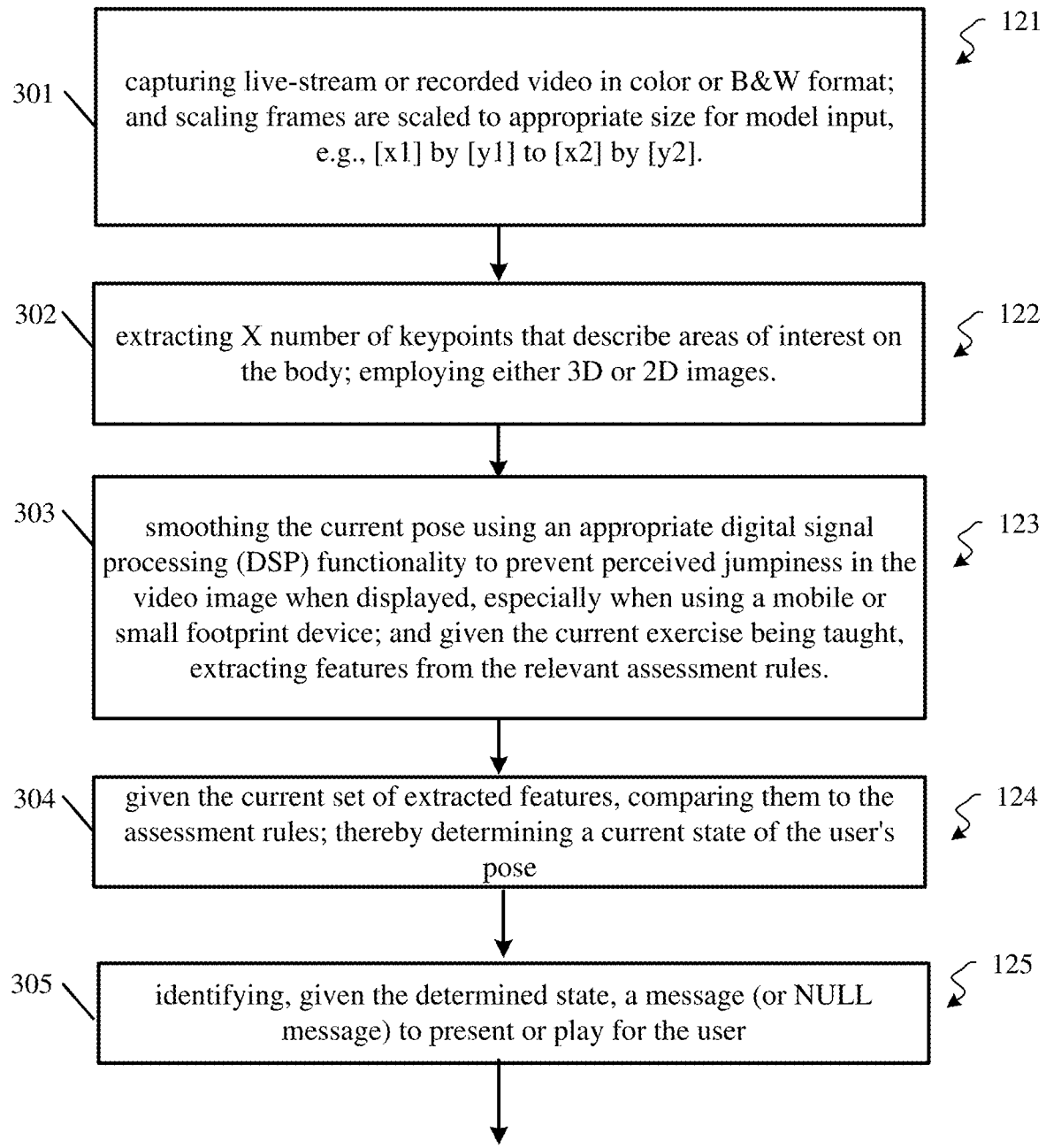
FIG. 3A illustrates a flowchart depicting an example processing conducted by edge application 120 for performing training using feedback and rule based motion analysis gathered from a user session in a representative implementation.
Figure 3B:
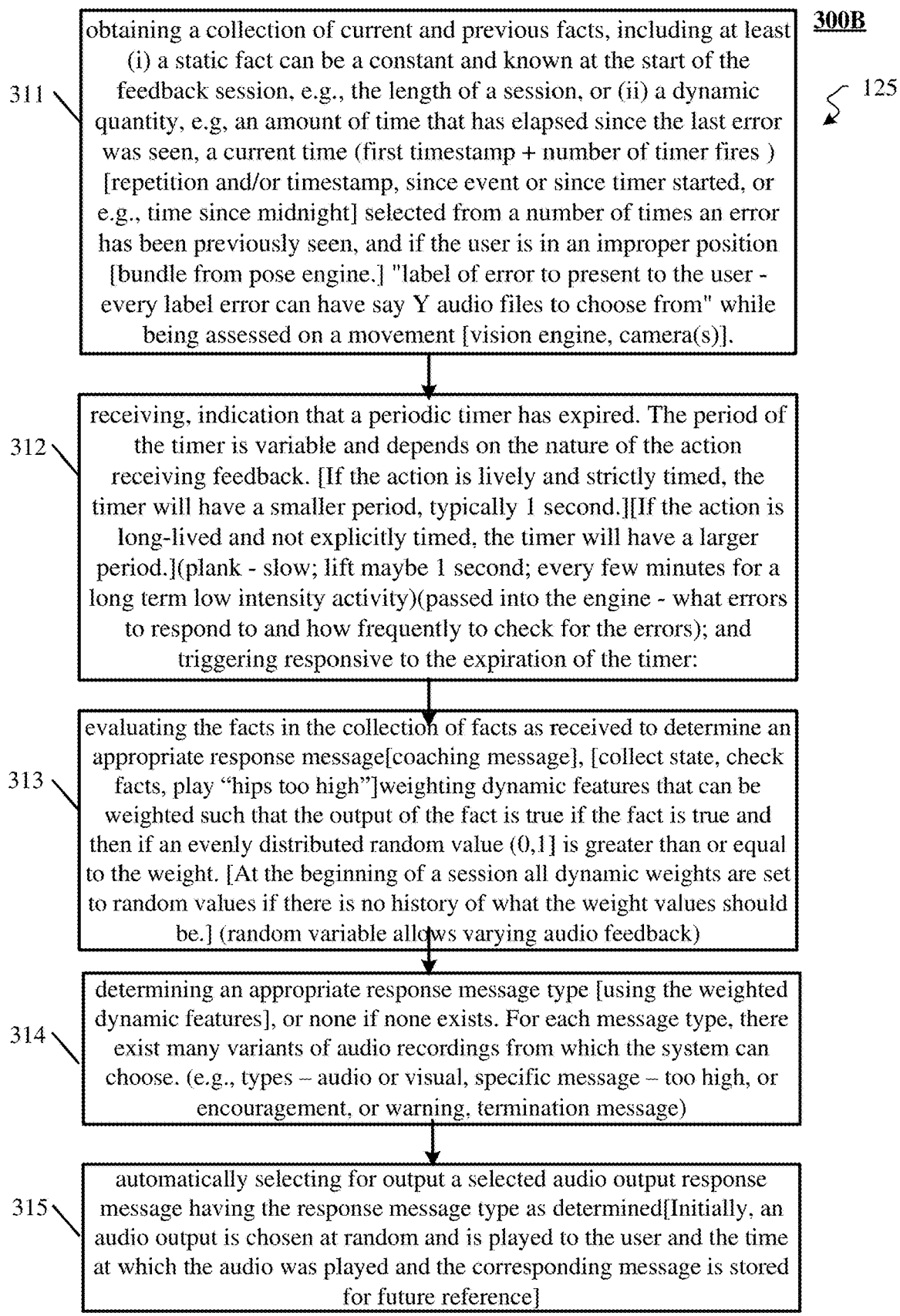
FIG. 3B illustrates a flowchart depicting an example process for performing rule-based feedback of motion analysis as may be embodied by feedback engine code 125 in a representative implementation.

Having reviewed the processes conducted by the AI server 104 in more detail with reference to FIGS. 2A, 2B, 2C and 2D, we now look at the processes conducted by the AI client 102 in more detail with reference to FIGS. 3A, 3B, and 3D.

Edge Application:

FIG. 3A illustrates a flowchart depicting an example processing conducted by an edge application 120 for performing training using feedback and rule-based motion analysis gathered from a user session in a representative implementation.

In block 301, live-stream or recorded video is captured by application video feed code 121 in color or B&W format. While embodiments can be realized in virtually any size video, one implementation presently in use employs video in 1920×1080 (landscape) and 1080×1920 (portrait) sizes), however other sizes are appropriate to various applications. Frames are scaled to appropriate size for model input, such as for example a currently implementation resizes to 224× 416 (portrait), 416×224 (landscape), however other sizes are appropriate to various applications.

In block 302, extracting by pose estimation code 122 X number of keypoints that describe areas of interest on the body. For example: in one implementation, the location of a keypoint corresponding to the user's head is found to be at (x: 200, y: 300). Implementations can employ either 3D or 2D images.

In block 303, feature extractor code 123 smooths the current pose using an appropriate digital signal processing (DSP) functionality to prevent perceived jumpiness in the video image when displayed, especially when using a mobile or small footprint device. One implementation uses Kalman filters to remove jumpiness (see e.g., //en.wikipedia.org/wiki/Kalman_filter; which is incorporated herein by reference in its entirety for all purposes). Another implementation uses 1 € ("One Euro") Filters as described in the paper here: //dLacm.org/doi/10.1145/2207676.2208639?cid=81100168597 which is incorporated herein by reference in its entirety for all purposes. Given the current exercise being taught, extract features from the relevant assessment rules 126.

In block 304, rules evaluator 124 implements given the current set of extracted features, comparing them to the assessment rules 126. Thus, the rules evaluator 124 is able to determine a current state of the user's pose.

In block 305, feedback engine 125 implements given the determined state, identify a message (or NULL message) to present or play for the user.

Feedback Engine:

FIG. 3B illustrates a flowchart depicting an example process for performing rule-based feedback of motion analysis as may be embodied by feedback engine code 125 in a representative implementation. In the example process illustrated by flowchart 300B, feedback engine 125 evaluates a collection of facts and determines an output message and an accompanying audio file to play based on how previous audio messages affected the user's performance of a specific task.

In block 311, receiving state information describing a user pose state, including: obtaining a collection of current and previous facts, including at least fact that can be a (ii) constant and known at the start of the feedback session, e.g., the length of a session, or (ii) dynamic, e.g, the amount of time that has elapsed since the last error was seen, a current time (first timestamp+number of timer fires) [repetition and/or timestamp, since event or since timer started, or e.g., time since midnight] selected from a number of times an error has been previously seen, and if the user is in an improper position [bundle from pose engine.] "label of error to present to the user—every label error can have say Y audio files to choose from" while being assessed on a movement [using a vision engine, and/or a camera(s)].

In block 312, receiving an indication that a periodic timer has expired. The period of the timer is variable and depends on the nature of the action receiving feedback. [If the action is lively and strictly timed, the timer will have a smaller period, typically 1 second.][If the action is long-lived and not explicitly timed, the timer will have a larger period.] (plank—slow; lift maybe 1 second; every few minutes for a long term low intensity activity)(passed into the engine— what errors to respond to and how frequently to check for the errors); and triggering responsive to the expiration of the timer:

In block 313, evaluating the facts in the collection of facts as received to determine an appropriate response message [e.g., a coaching message], including: [collect state, check facts, play "hips too high"] weighting dynamic features that can be weighted such that the output of the fact is true if the fact is true and then if an evenly distributed random value (0,1] is greater than or equal to the weight. [At the beginning of a session all dynamic weights are set to random values if there is no history of what the weight values should be.] (a random variable can allow varying audio feedback).

In block 314, determining an appropriate response message type [using the weighted dynamic features], or none if none exists. For each message type, there exist many variants of audio recordings from which the system can choose (e.g., types—audio or visual, specific message—too high, or encouragement, or warning, termination message).

In block 315, automatically selecting for output a selected audio output response message having the response message type as determined. Initially, an audio output is chosen at random and is played to the user and the time at which the audio was played and the corresponding message is stored for future reference.

Figure 3C:
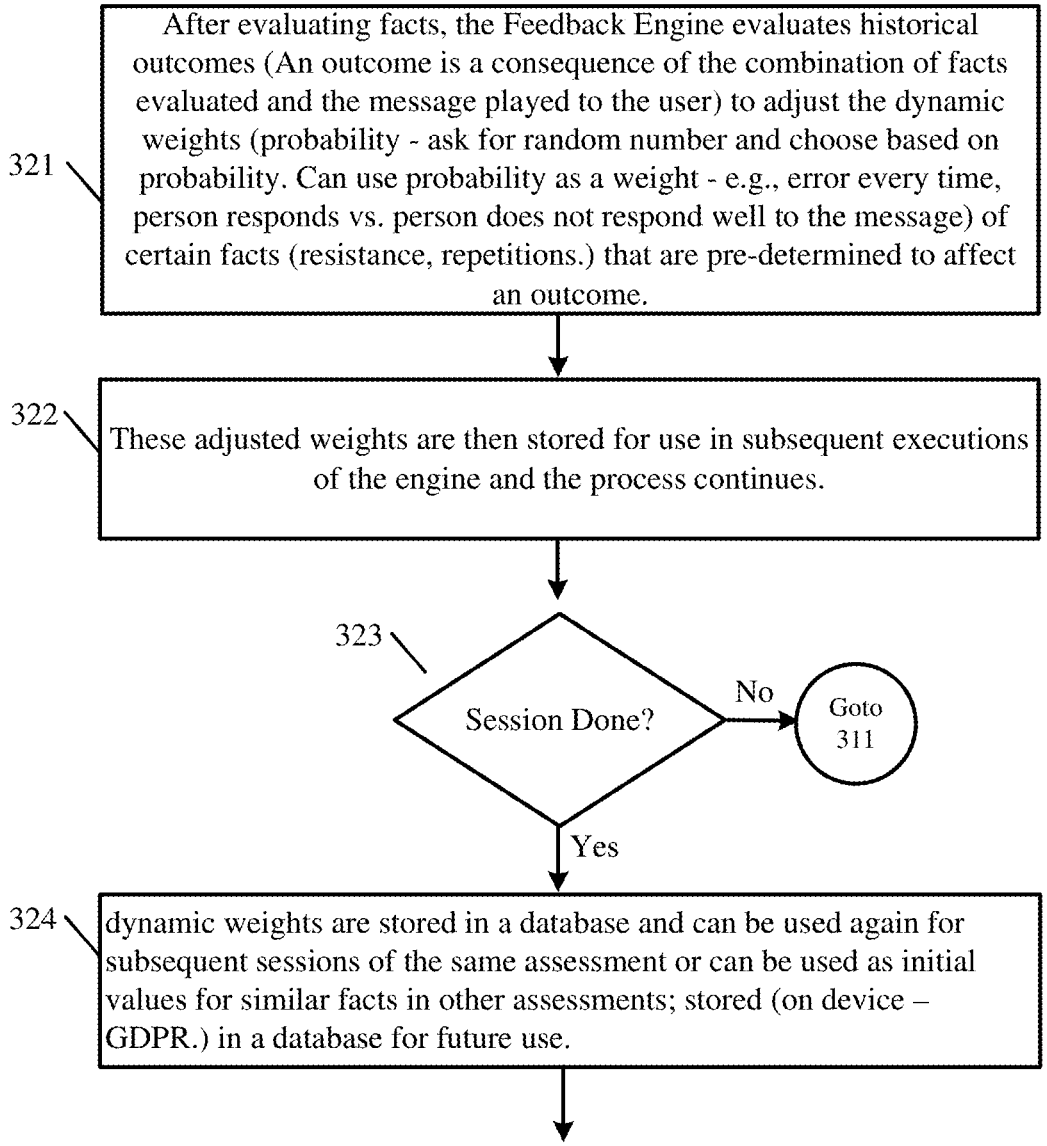
FIG. 3C illustrates a flowchart depicting an example process for performing continual training of a machine learning automaton based upon feedback and rule-based motion analysis gathered from a user session in a representative implementation.

FIG. 3C illustrates a flowchart depicting an example process for performing continual training of a machine learning automaton based upon feedback and rule-based motion analysis gathered from a user session in a representative implementation. Once performing the audio output response message is selected in block 315 of FIG. 3B, control passes to the processing of FIG. 3C in a second thread that analyzes what has happened—e.g., capturing results and evaluating historical outcomes are performed by counting a count of corrections, etc. thereby enabling viewing a stream of decisions over time.

In a block 321, After evaluating facts, the Feedback Engine evaluates historical outcomes. An outcome is a consequence of the combination of facts evaluated and the message played to the user. By evaluating all previous outcomes, the time between similar outcomes can be identified. For instance, the time between two errors reported to the user can be evaluated. In implementations, fitting something to data points, e.g., fitting a line to data points. [The system can then use machine learning approaches such as association rules and linear regression] (e.g., maximize time/reps between errors, gradient descent.) Some embodiments implement Variable times. Some embodiments implement a Max time between consecutive errors. This can achieve Mirroring what coach wants to get out of you. Some embodiments implement techniques for tracking for a Long term—e.g., 10 session's worth of data to collect sufficient sample size to adjust the dynamic weights Some embodiments implement using a probability—ask for random number and choose based on probability—as a weight—e.g., error every time, person responds vs. person does not respond well to the message, of certain facts (resistance, repetitions, etc.) that are pre-determined to affect an outcome.

In a block 322, dynamic weights adjusted based upon the outcome of the processing of block 321 are stored (e.g., as floating-point, or other numbers)—useful as personalization to a user to bring about desired outcome for that user. These adjusted weights are then used in subsequent executions of the engine and the process continues.

In a block 323, if training is continuing, control passes back to block 311 of FIG. 3B. Otherwise, when a feedback session ends, in block 324, the dynamic weights are stored in a database and can be used again for subsequent sessions of the same assessment or can be used as initial values for similar facts in other assessments. Preferably, dynamic weights are stored on the device 102—to meet privacy, e.g., GDPR requirements, in a database for future use.

The computer implemented methods described above can be practiced in a system that includes computer hardware. The computer implemented system can practice one or more of the methods described above. The computer implemented system can incorporate any of the features of methods described immediately above or throughout this application that apply to the method implemented by the system. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

As an article of manufacture, rather than a method, a non-transitory computer readable medium (CRM) can be loaded with program instructions executable by a processor. The program instructions when executed, implement one or more of the computer-implemented methods described above. Alternatively, the program instructions can be loaded on a non-transitory CRM and, when combined with appropriate hardware, become a component of one or more of the computer-implemented systems that practice the methods disclosed.

Each of the features discussed in this particular implementation section for the method implementation apply equally to CRM and system implementations. As indicated above, all the method features are not repeated here, in the interest of conciseness, and should be considered repeated by reference.

Figure 4:
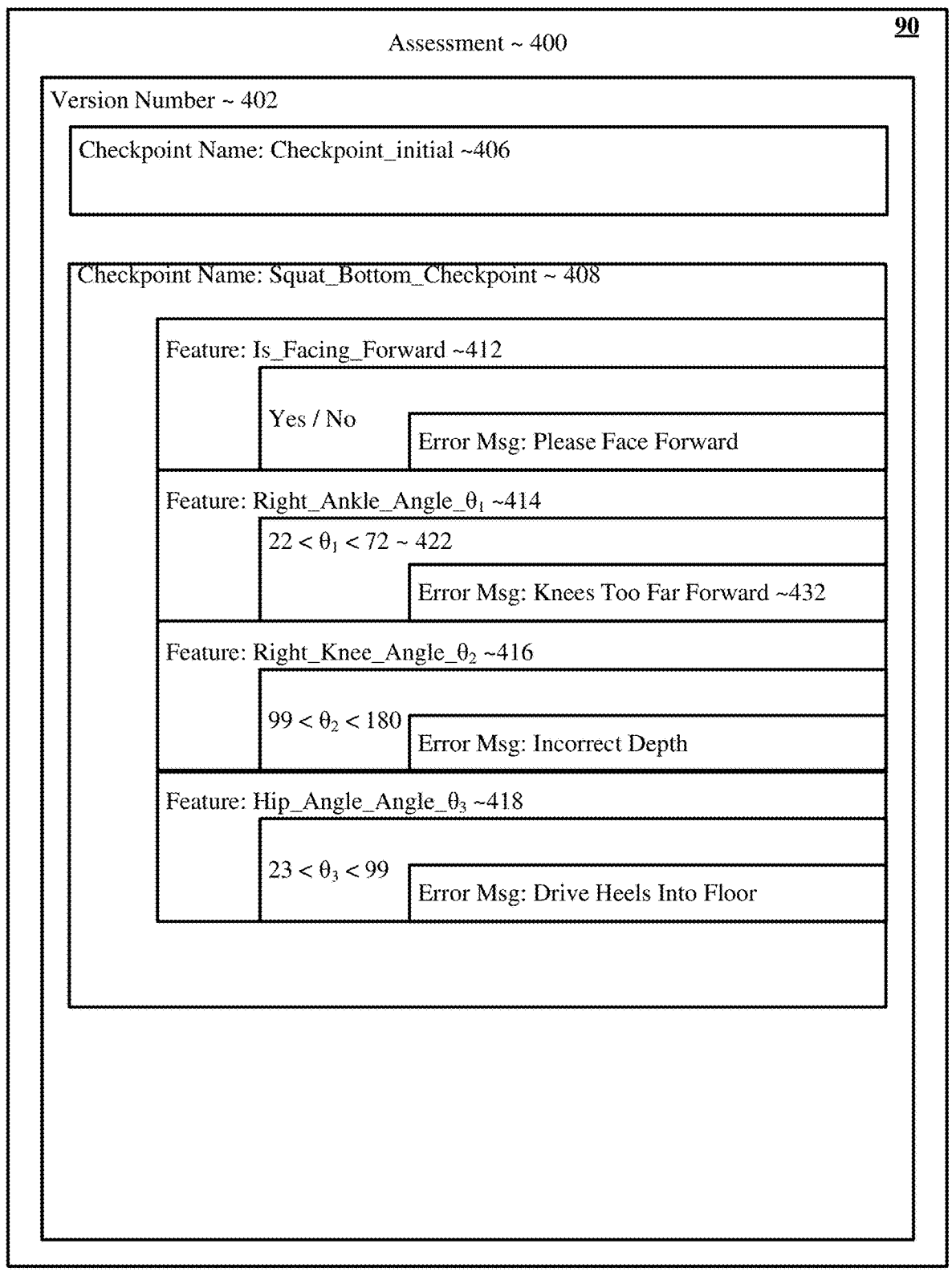
FIG. 4 illustrates a typical payload exchanged between an AI server implementation and an AI client implementation in an embodiment.

Payload Data Model:

FIG. 4 illustrates a typical payload exchanged between an AI server implementation and an AI client implementation in an embodiment. Payload 90 of FIG. 4 includes assessment rules 400 that are provided to an AI client 102 by an AI server 104 implement that follow these guidelines:

1. Each checkpoint 406, 408 for an exercise is labeled using "checkpoint_[name]". A checkpoint entitled "checkpoint_initial" (e.g., 406) is required for all exercises.

2. For each checkpoint, e.g., 408, the working side of the body is listed as well as the combination of features 412, 414, 416, 418 that are used to identify the checkpoint.

3. For each feature, a range of values is provided. Some features may be a single value (e.g., checkpoint 408 includes feature 412 "is_facing_forward"), some may have 2 values with a min and max value, e.g., checkpoint 408 also includes feature 414 (Right_Ankle_Angle_$\theta_1$) having min value of 22 degrees and a max value of 72 degrees, see e.g., 422, and some may have 4 ranges with a lower min max and a higher min max (not shown in FIG. 4 for clarity sake).

4. Other metadata provided in the admin GUI, such as error messages to tell the user to coach them in the event of an identified checkpoint, are listed under each checkpoint as well. For example, feature 414 includes an error message 432 "Knees Too Far Forward" that can be triggered for display by client 102 upon detecting a user's Right_Ankle_Angle falling below the min value.

5. The Assessment Rules 400 of payload 90 defines a version number 402, which represents the version of the client-side Edge Application 120 implementation that is required to parse it successfully.

Example Image Processing and Pose Recognition

Figure 5A:
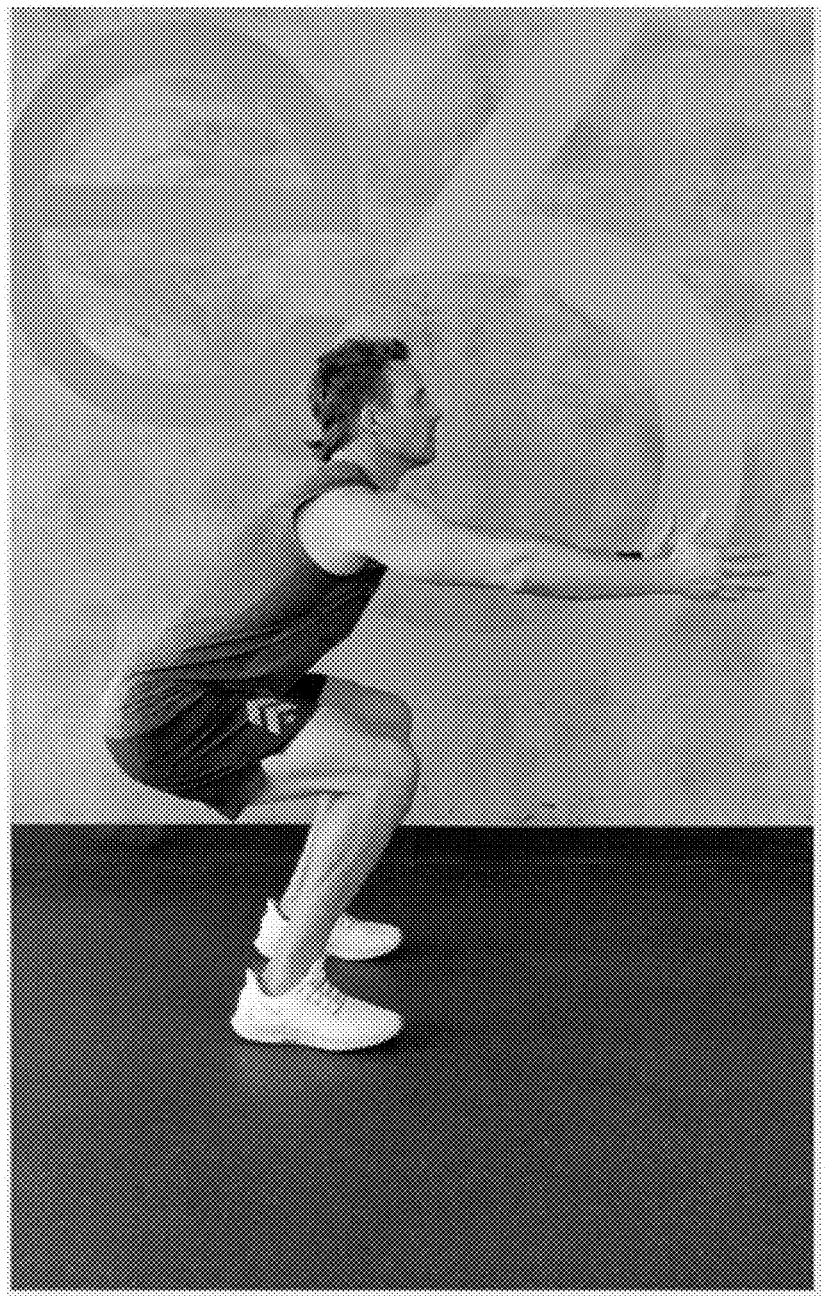
FIG. 5A illustrates an example raw image frame in an example application of the disclosed technology to conduct training using feedback and rule-based motion analysis gathered from a user session in a representative implementation.

FIG. 5A illustrates an example raw image frame in an example application of the disclosed technology to conduct training using feedback and rule-based motion analysis gathered from a user session in a representative implementation. An image frame, typically from a live video feed, is extracted and fed into the pose estimation model.

FIG. 5B illustrates an example raw model output in an example application of the disclosed technology to conduct training using feedback and rule-based motion analysis gathered from a user session in a representative implementation. The pose estimation model's outputs are then processed to return a raw list of coordinates and the corresponding confidence of each coordinate pair depicted by FIG. 5B.

Figure 5C:
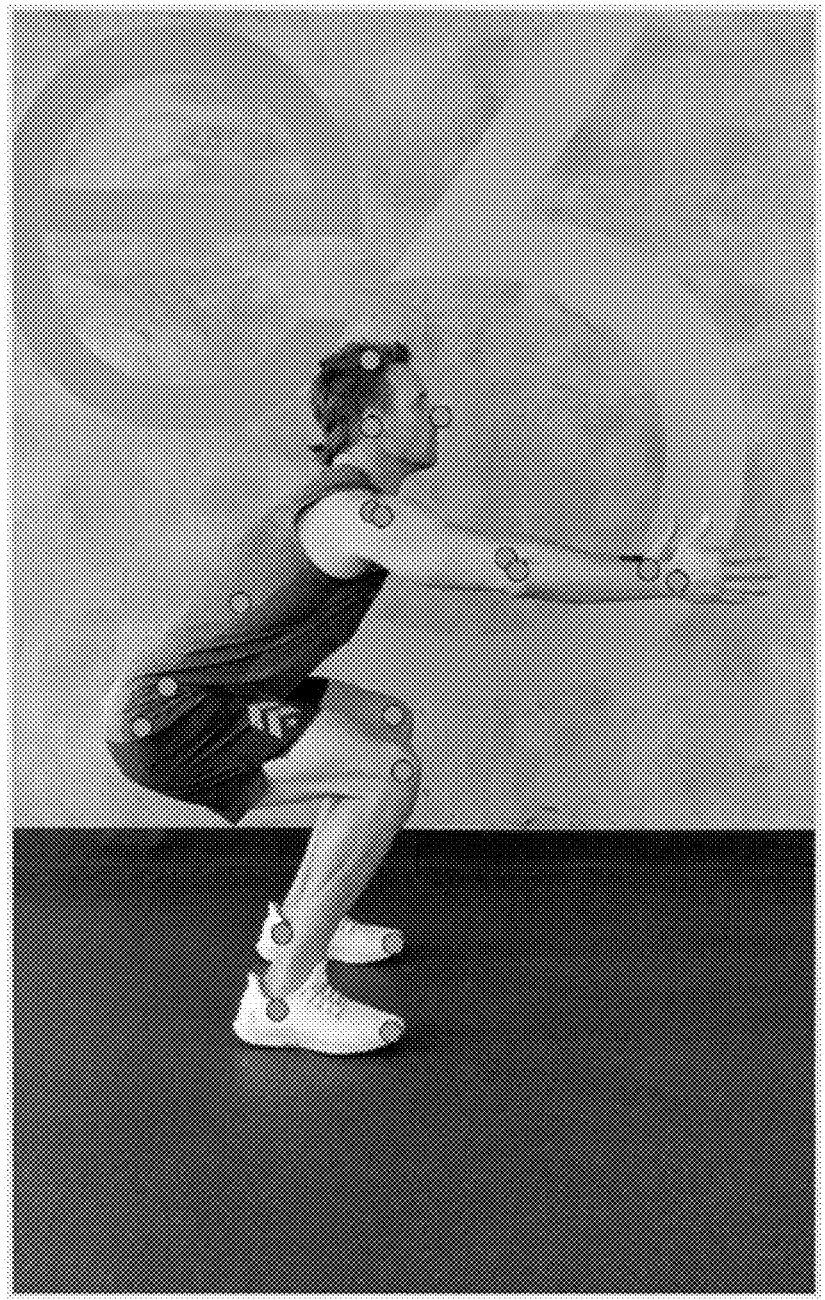
FIG. 5C illustrates an example annotated image output in an example application of the disclosed technology to conduct training using feedback and rule-based motion analysis gathered from a user session in a representative implementation.

FIG. 5C illustrates an example annotated image output in an example application of the disclosed technology to conduct training using feedback and rule-based motion analysis gathered from a user session in a representative implementation. In FIG. 5C, the coordinates are scaled to match the image's coordinates and are annotated on the input image. Each identified coordinate is a key point.

Figure 5D:
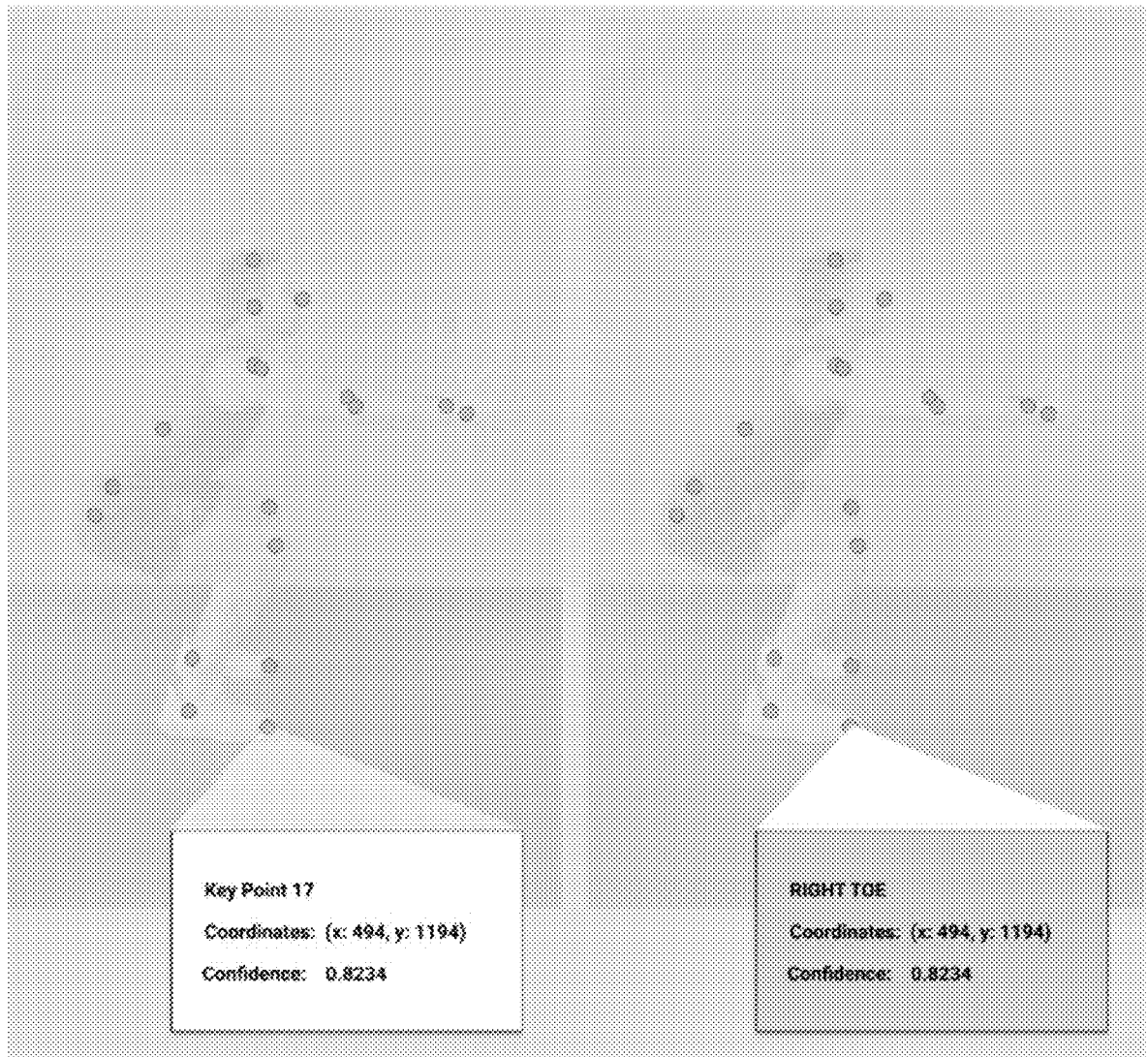
FIG. 5D illustrates an example of translating key points to body joints in an example application of the disclosed technology to conduct training using feedback and rule-based motion analysis gathered from a user session in a representative implementation.

FIG. 5D illustrates an example of translating key points to body joints in an example application of the disclosed technology to conduct training using feedback and rule-based motion analysis gathered from a user session in a representative implementation. The index of the key point in the output from the pose estimation model correlates to the key point that was used for training the model. Each of the points used in training has a semantic meaning; for example, the point at the tip of the right foot of the user is given the semantic label "Right Toe". This label is known as a body joint. A set of coordinates of the point is also provided. The coordinates returned from the model are in the coordinate space of the input image, e.g., 224×416. The outputted coordinates are then translated to that of the display image, e.g., 768×1024. To create the figure we show the coordinates were translated. Also, a confidence level is also included.

Figure 5E:
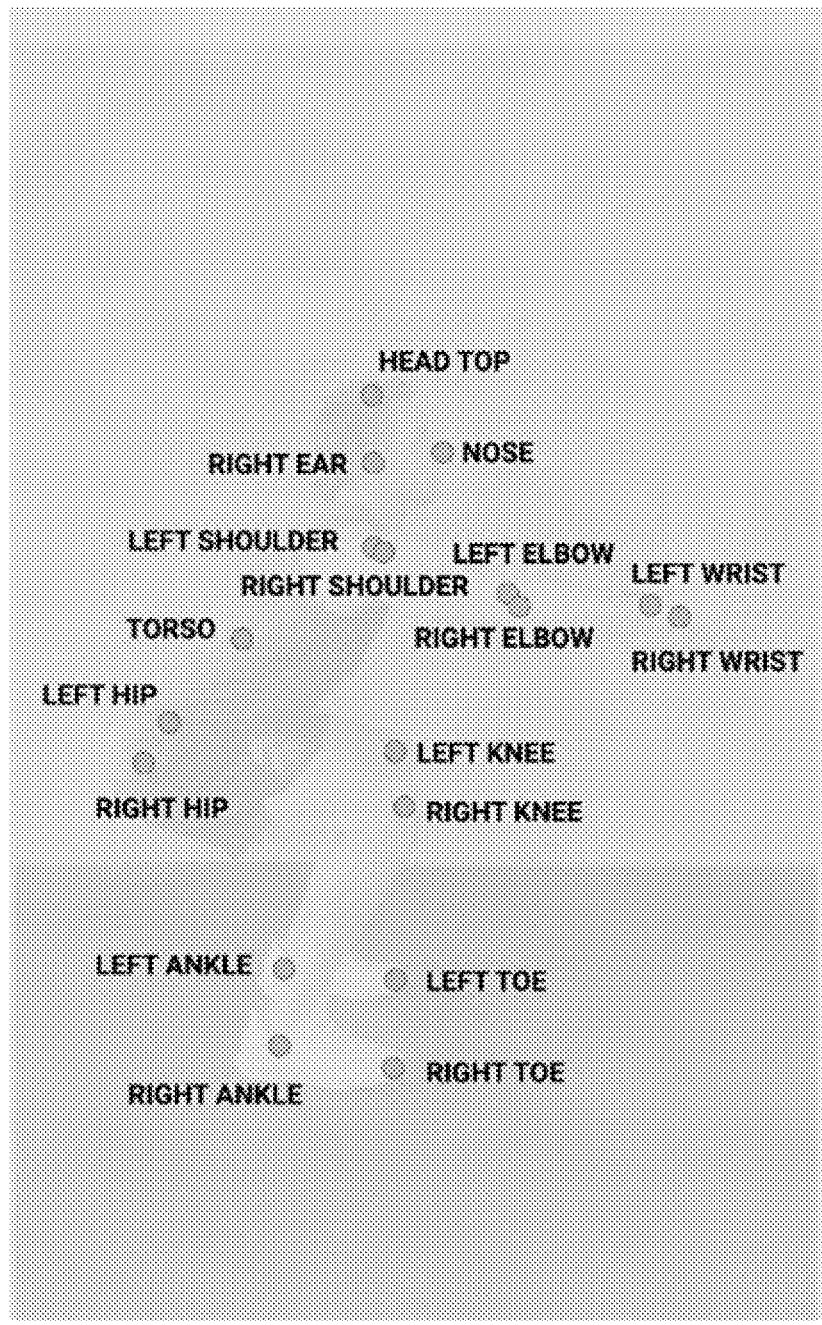
FIG. 5E illustrates an example labelling in an example application of the disclosed technology to conduct training using feedback and rule-based motion analysis gathered from a user session in a representative implementation.

FIG. 5E illustrates an example labelling in an example application of the disclosed technology to conduct training using feedback and rule-based motion analysis gathered from a user session in a representative implementation. Each of the output key points has a significance. Here the corresponding meanings, or body joints, are illustrated by FIG. 5E for the example key points.

Figure 5F:
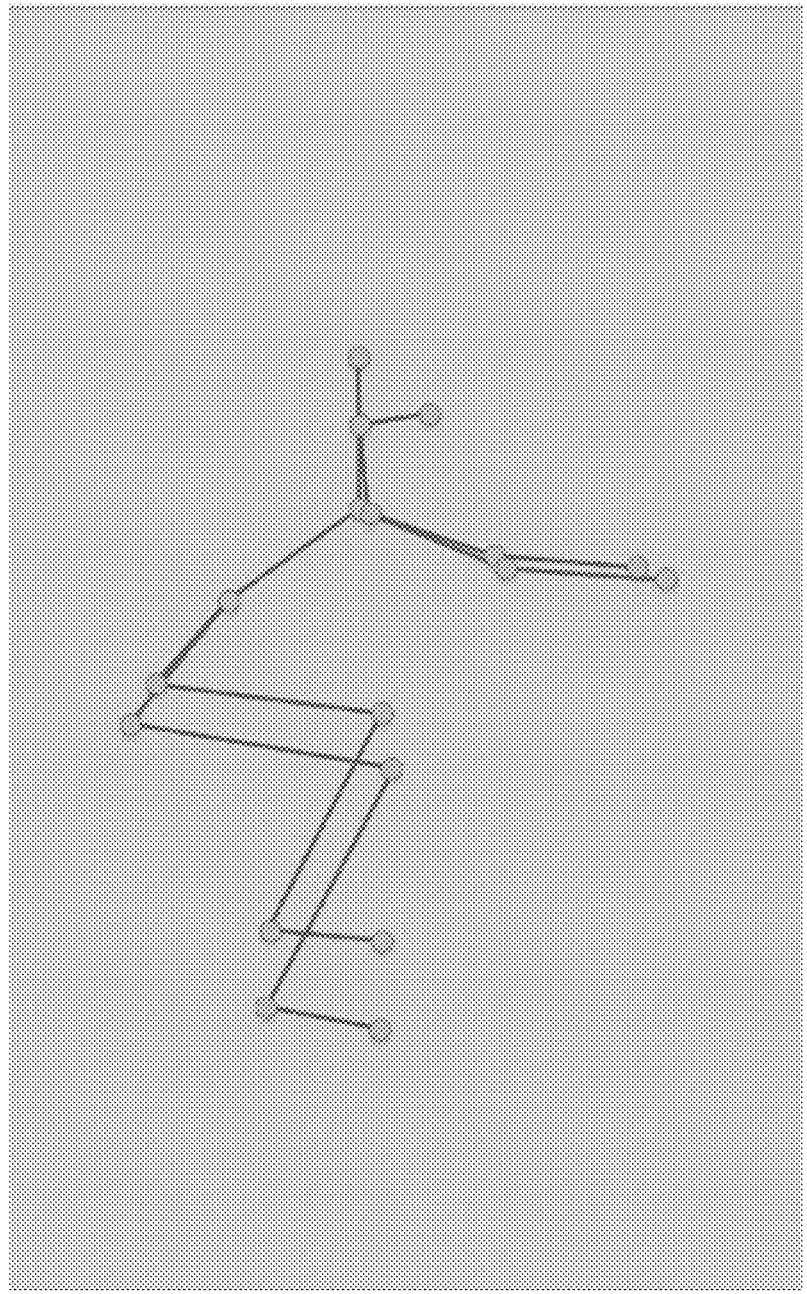
FIG. 5F illustrates an example keypoints in a pose in an example application of the disclosed technology to conduct training using feedback and rule-based motion analysis gathered from a user session in a representative implementation.

FIG. 5F illustrates an example keypoints in a pose in an example application of the disclosed technology to conduct training using feedback and rule-based motion analysis gathered from a user session in a representative implementation. The collection of points shown in FIG. 5F is a pose. The pose includes each of the identified key points and the corresponding confidence.

Figure 5G:
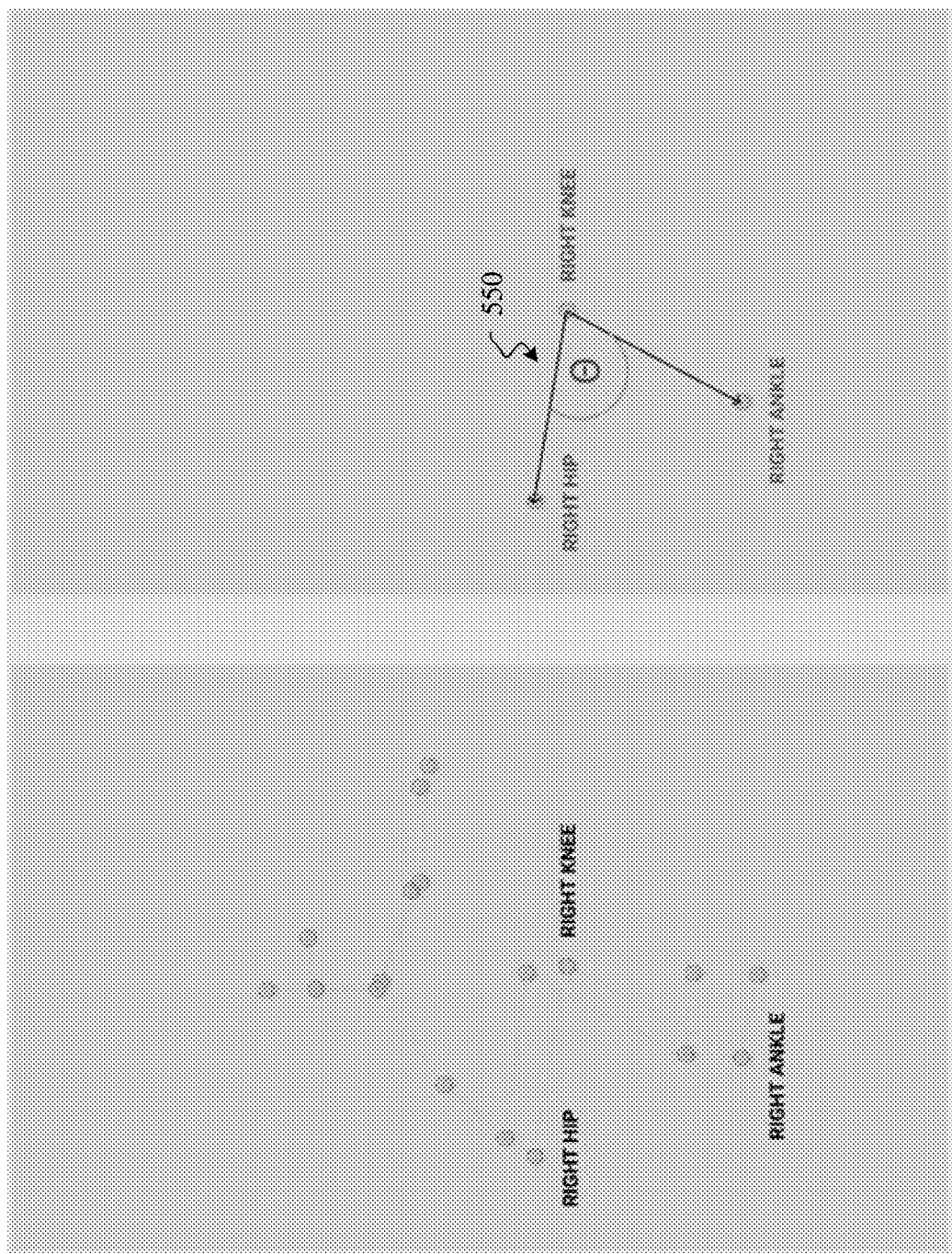
FIG. 5G illustrates an example feature definition in an example application of the disclosed technology to conduct training using feedback and rule-based motion analysis gathered from a user session in a representative implementation.

FIG. 5G illustrates an example feature definition in an example application of the disclosed technology to conduct training using feedback and rule-based motion analysis gathered from a user session in a representative implementation. Information derived from key point locations is referred to as a "feature". A common feature is the angle between related key points. Indicated as "θ" in FIG. 5G is the "Right_Knee_Hip_Anke Angle" feature 550.

Figure 5H:
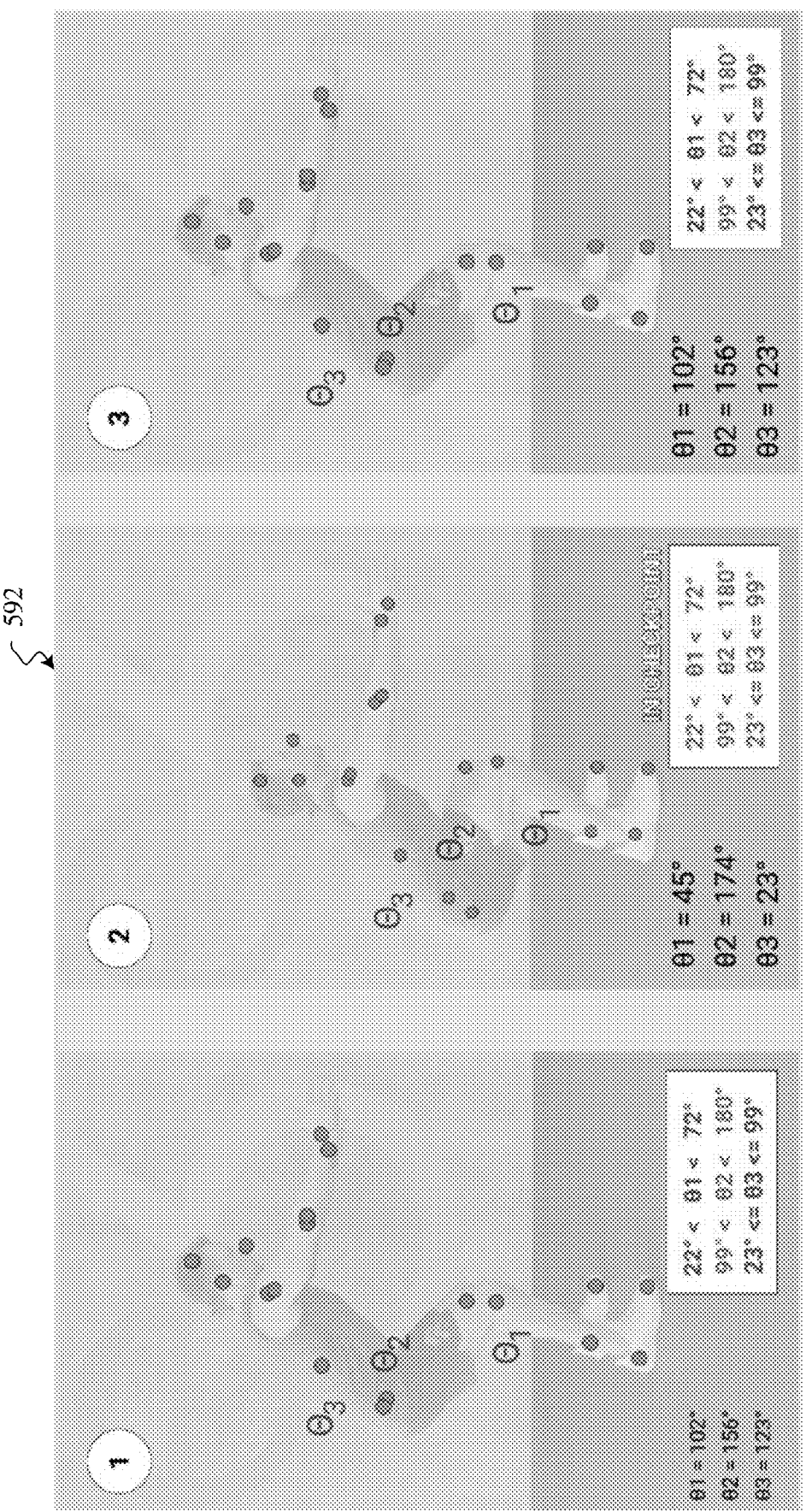
FIG. 5H illustrates an example checkpoints definition in an example application of the disclosed technology to conduct training using feedback and rule-based motion analysis gathered from a user session in a representative implementation.

FIG. 5H illustrates an example checkpoints definition in an example application of the disclosed technology to conduct training using feedback and rule-based motion analysis gathered from a user session in a representative implementation. Given a timeline of images (e.g., those from a live video feed), each identified poses' features are analyzed. A checkpoint is a collection of feature ranges that identify a position in a movement of importance. Image 592 of FIG. 5H shows that the detected features (θ1, θ2, θ3) are within the ranges that are acceptable for the given checkpoint. In some implementations, movement checkpoints outside of a range are displayed in red by a graphical user interface (GUI) and movement checkpoints within a range are displayed in green by the graphical user interface (GUI).

Figure 6:
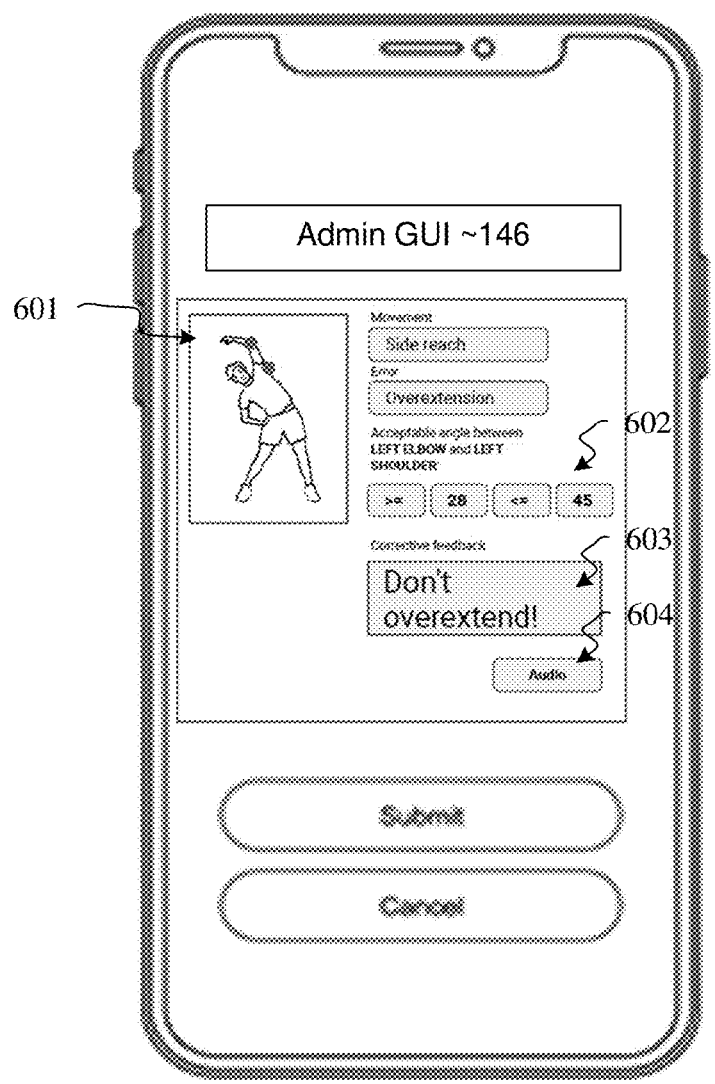
FIG. 6 illustrates an example graphical user interface (GUI) implemented in some embodiments.

FIG. 6 illustrates an example graphical user interface (GUI) implemented in some embodiments. The Admin GUI 146 of FIG. 6 is used by the coach to modify errors and attach text and audio feedback for the user. A clickable interface to identify "important" joints 601. Clickable interface 602 enables manually setting ranges for body features (these will be pre-populated by the automated process). Display window 603 provides text correction for user. Clickable Audio button 604 enables attaching audio of coaching the correction.

Figure 7:
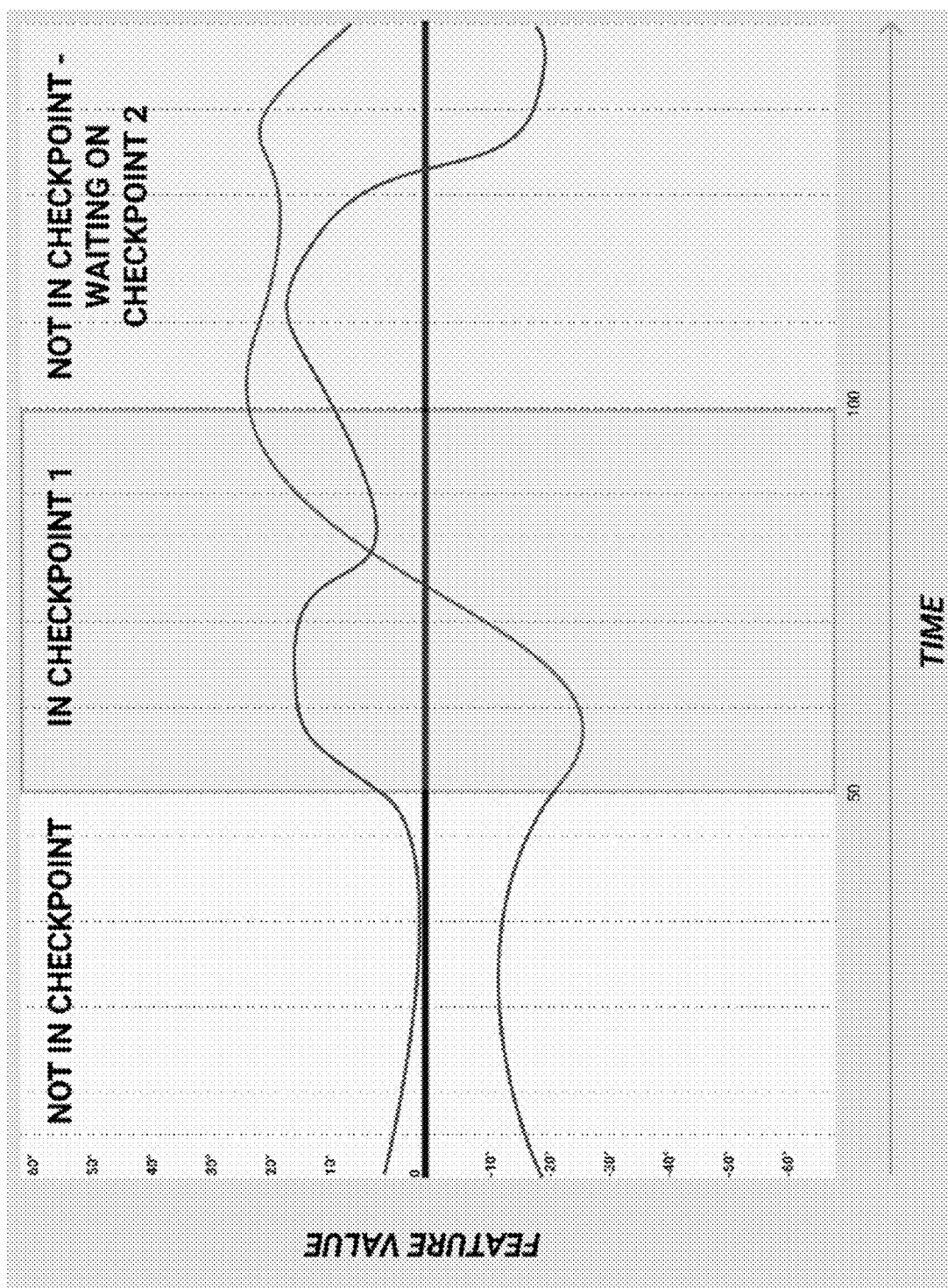
FIG. 7 illustrates assessing poses over time of checkpoints in an example application of the disclosed technology to conduct training using feedback and rule-based motion analysis gathered from a user session in a representative implementation.

FIG. 7 illustrates assessing poses over time of checkpoints in an example application of the disclosed technology to conduct training using feedback and rule-based motion analysis gathered from a user session in a representative implementation. In FIG. 7, two feature values are mapped over time. Each vertical dotted line is a clock timer tick. The measured values between clock timer ticks are smoothed to create a line or curve for visualization purposes. At time 50, the feature values are both within angle ranges that are pre-determined by teaching the neural network to represent a checkpoint. They remain the acceptable ranges for that checkpoint until time 100. The example then leaves that state and waits for the next checkpoint.

Classifier Inputs and Outputs

FIG. 8 illustrates a labelling of an exemplary input training set for training a deep neural network implementation. The implementation example in FIG. 8 selects an appropriate audio feedback using a set of inputs to the neural network. Inputs (θ1, θ2, θ3) in the example illustrated by FIG. 8 correspond to angles in FIGS. 5A-51I. Whether structured or unstructured data type data points, inputs can be encoded into fields of a vector (or tensor) representation. Implementations will employ various levels of abstraction in configuring, classification and anomaly detection tasks, e.g., in a physical therapy application, data can be selected to describe movements, rates of repetitions, number of repetitions to failure and so forth. In one example, a neural network ensemble can implement a classifiers that are trained to classify situation states according to input data useful in human movement training applications, such as without limitation physiotherapies, personal training, athletic training, and the like.

The classifier(s) once trained on a training dataset 800 can determine based on the inputs whether an observed motion is meets success criteria (Correct form, Sufficient repetitions, Sufficient rate) for a particular situation state. The exemplary deep neural network implementation selects an appropriate classification of a failing effort when detected and can select an appropriate audio feedback and detect a dangerous situation from a set of inputs.

In one exemplary implementation, some neural networks implementing learning model(s) 131 are implemented as an ensemble of subnetworks trained using datasets widely chosen from approved transactions and flagged transactions, with outputs including classifications of anomalies based upon the input sensed data, and/or remedial actions to be triggered by invoking downstream applications such as audio feedback, preparing and submitting reports to a human coach or trainer, as well as the capability to both cluster information and to escalate problems.

Computer System

Figure 9:
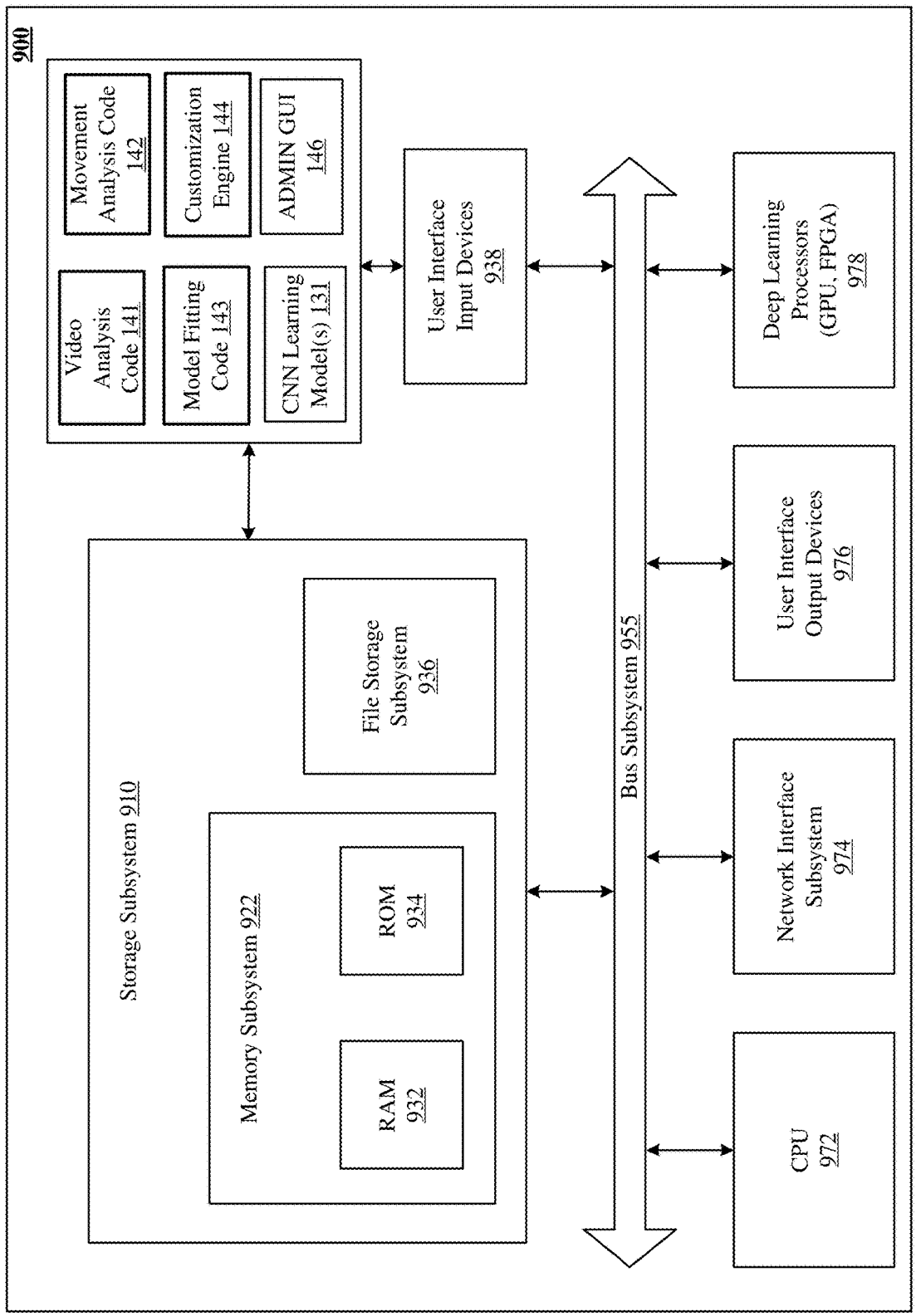
FIG. 9 illustrates one implementation of a computer system 900 that can be used to implement the technology disclosed.

FIG. 9 illustrates one implementation of a computer system 900 that can be used to implement the technology disclosed. Computer system 900 includes at least one central processing unit (CPU) 972 that communicates with a number of peripheral devices via bus subsystem 955. These peripheral devices can include a storage subsystem 910 including, for example, memory devices and a file storage subsystem 936, user interface input devices 938, user interface output devices 976, and a network interface subsystem 974. The input and output devices allow user interaction with computer system 900. Network interface subsystem 974 provides an interface to outside networks, including an interface to corresponding interface devices in other computer systems. The analyzer and deep learning system can be communicably linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. These software modules are generally executed by deep learning processors 978.

Deep learning processors 978 can be graphics processing units (GPUs) or field-programmable gate arrays (FPGAs). Deep learning processors 978 can be hosted by a deep learning cloud platform such as Google Cloud Platform™, Xilinx™, and Cirrascale™. Examples of deep learning processors 978 include Google's Tensor Processing Unit (TPU)™, rackmount solutions like GX4 Rackmount Series™, GX2 Rackmount Series™, NVIDIA DGX-1™ Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™ NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 922 used in the storage subsystem 910 can include a number of memories including a main random access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 910, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or less components than the computer system depicted in FIG. 9.

Figure 10:
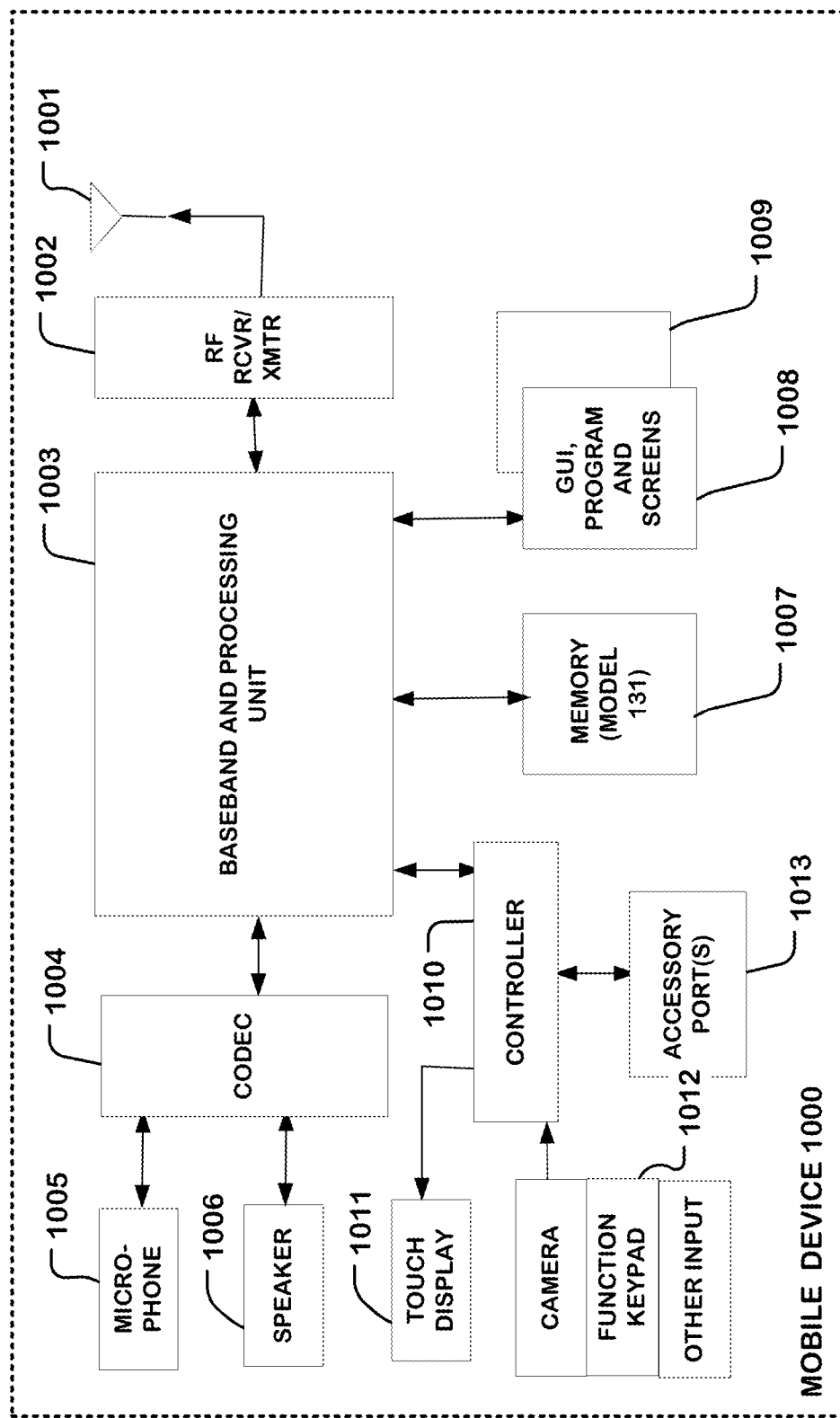
FIG. 10 is a simplified diagram of a mobile phone computing platform 1000, representative of computing devices which can be used as an apparatus for edge application 120 described herein.

FIG. 10 is a simplified diagram of a mobile phone computing platform 1000, representative of computing devices which can be used as an apparatus for edge application 120 described herein. Other computing devices configured for user motion observation, as described herein, can have a similar platform, including devices which can be modular in form factor for deployment in a variety of settings, and that are configured for communication with local servers, and devices that are configured for wireless communication via the internet, rather than the mobile phone network.

In this example, the computing platform 1000 includes an antenna 1001 and a radio including a radio frequency RF receiver/transmitter 1002, by which the computing platform 1000 is coupled to a wireless communication medium, according to one or more of a variety of protocols. In examples described herein, the RF receiver/transmitter 1002 can include one or more radios to support multiprotocol/multiband communications for communication with the wireless service provider of the mobile phone network, as well as the establishment of wireless local radio links using a protocol like Bluetooth® or WIFI protocols. The receiver/transmitter 1002 is coupled to baseband circuitry and a digital processor in processing section 1003, in which the audio signals are processed and call signals are managed. A codec 1004, including analog-to-digital and digital-to-analog converters, is coupled to the processing section 1003. A microphone 1005 and a speaker 1006 are coupled to the codec 1004.

Memory 1007 which can be a nonvolatile read-only memory, stores a dynamic weightings, rules, neural networks, and machine learning model artifacts for use in a recognition and classification algorithms, as well as instructions, parameters and other data for execution by the processing section 1003. In addition, a read/write memory 1008 in the mobile phone stores instructions and parameters for recognition processes and other data for use by the processing section 1003. There may be multiple types of read/write memory on the computing platform 1000, such as nonvolatile read/write memory 1008 (flash memory or EEPROM for example) and volatile read/write memory 1009 (DRAM or SRAM for example). Other embodiments include removable memory modules in which instructions, parameters and other data for use by the processing section 1003 are stored.

An input/output controller 1010 is coupled to a touch sensitive display 1011 and to user input devices 1012, such as a camera, a function keypad, activity trackers connectible via Bluetooth, WIFI or the like. The camera can be used to capture images for the motion recognition and classification and instruction. An accessory port or ports 1013 coupled to the controller 1010 are used for other types of input/output devices, such as binaural and monaural headphones, connections to processing devices such as PDAs, or personal computers, alternative communication channels such as an infrared port or universal serial bus USB port, a portable storage device port, and other things. The controller 1010 is coupled to the processing section 1003. User input concerning call set up and call management, and concerning use of the motion recognition and classification and instruction, user preferences and the like received via the input devices 1012 and optionally via accessories. User interaction is enhanced, and the user is prompted to interact, using the touch display 1011 and optionally other accessories. Input may also be received via the microphone 1005 supported by voice recognition programs, and user interaction and prompting may utilize the speaker 1006 for various purposes.

In the illustrated embodiment, memory 1008 stores a program for displaying a function selection menu user interface on the display 1011, such that the user can select the functions to be carried out during the motion recognition and classification and instruction discussed herein. Also, the instructions executable by the processing section 1003 and/ or the controller 1010, are stored in a non-transitory medium such as the memory 1007, 1008, 1009, that includes logic for executing the sequence of operations outlined above in connection with FIGS. 2A, 2B, 2C, 2D and 3A, 3B, and 3C.

Convolutional Neural Networks

A convolutional neural network is a special type of neural network. The fundamental difference between a densely connected layer and a convolution layer is this: Dense layers learn global patterns in their input feature space, whereas convolution layers learn local patterns: in the case of images, patterns found in small 2D windows of the inputs. This key characteristic gives convolutional neural networks two interesting properties: (1) the patterns they learn are translation invariant and (2) they can learn spatial hierarchies of patterns.

Regarding the first, after learning a certain pattern in the lower-right corner of a picture, a convolution layer can recognize it anywhere: for example, in the upper-left corner. A densely connected network would learn the pattern anew if it appeared at a new location. This makes convolutional neural networks data efficient because they need fewer training samples to learn representations they have generalization power.

Regarding the second, a first convolution layer can learn small local patterns such as edges, a second convolution layer will learn larger patterns made of the features of the first layers, and so on. This allows convolutional neural networks to efficiently learn increasingly complex and abstract visual concepts.

A convolutional neural network learns highly non-linear mappings by interconnecting layers of artificial neurons arranged in many different layers with activation functions that make the layers dependent. It includes one or more convolutional layers, interspersed with one or more subsampling layers and non-linear layers, which are typically followed by one or more fully connected layers. Each element of the convolutional neural network receives inputs from a set of features in the previous layer. The convolutional neural network learns concurrently because the neurons in the same feature map have identical weights. These local shared weights reduce the complexity of the network such that when multi-dimensional input data enters the network, the convolutional neural network avoids the complexity of data reconstruction in feature extraction and regression or classification process.

Convolutions operate over 3D tensors, called feature maps, with two spatial axes (height and width) as well as a depth axis (also called the channels axis). For an RGB image, the dimension of the depth axis is 3, because the image has three color channels; red, green, and blue. For a black-and-white picture, the depth is 1 (levels of gray). The convolution operation extracts patches from its input feature map and applies the same transformation to all of these patches, producing an output feature map. This output feature map is still a 3D tensor: it has a width and a height. Its depth can be arbitrary, because the output depth is a parameter of the layer, and the different channels in that depth axis no longer stand for specific colors as in RGB input; rather, they stand for filters. Filters encode specific aspects of the input data: at a height level, a single filter could encode the concept "presence of a face in the input," for instance.

For example, the first convolution layer takes a feature map of size (28, 28, 1) and outputs a feature map of size (26, 26, 32): it computes 32 filters over its input. Each of these 32 output channels contains a 26×26 grid of values, which is a response map of the filter over the input, indicating the response of that filter pattern at different locations in the input. That is what the term feature map means: every dimension in the depth axis is a feature (or filter), and the 2D tensor output [:, :, n] is the 2D spatial map of the response of this filter over the input.

Convolutions are defined by two key parameters: (1) size of the patches extracted from the inputs—these are typically 1×1, 3×3 or 5×5 and (2) depth of the output feature map— the number of filters computed by the convolution. Often these start with a depth of 32, continue to a depth of 64, and terminate with a depth of 128 or 256.

Figure 11:
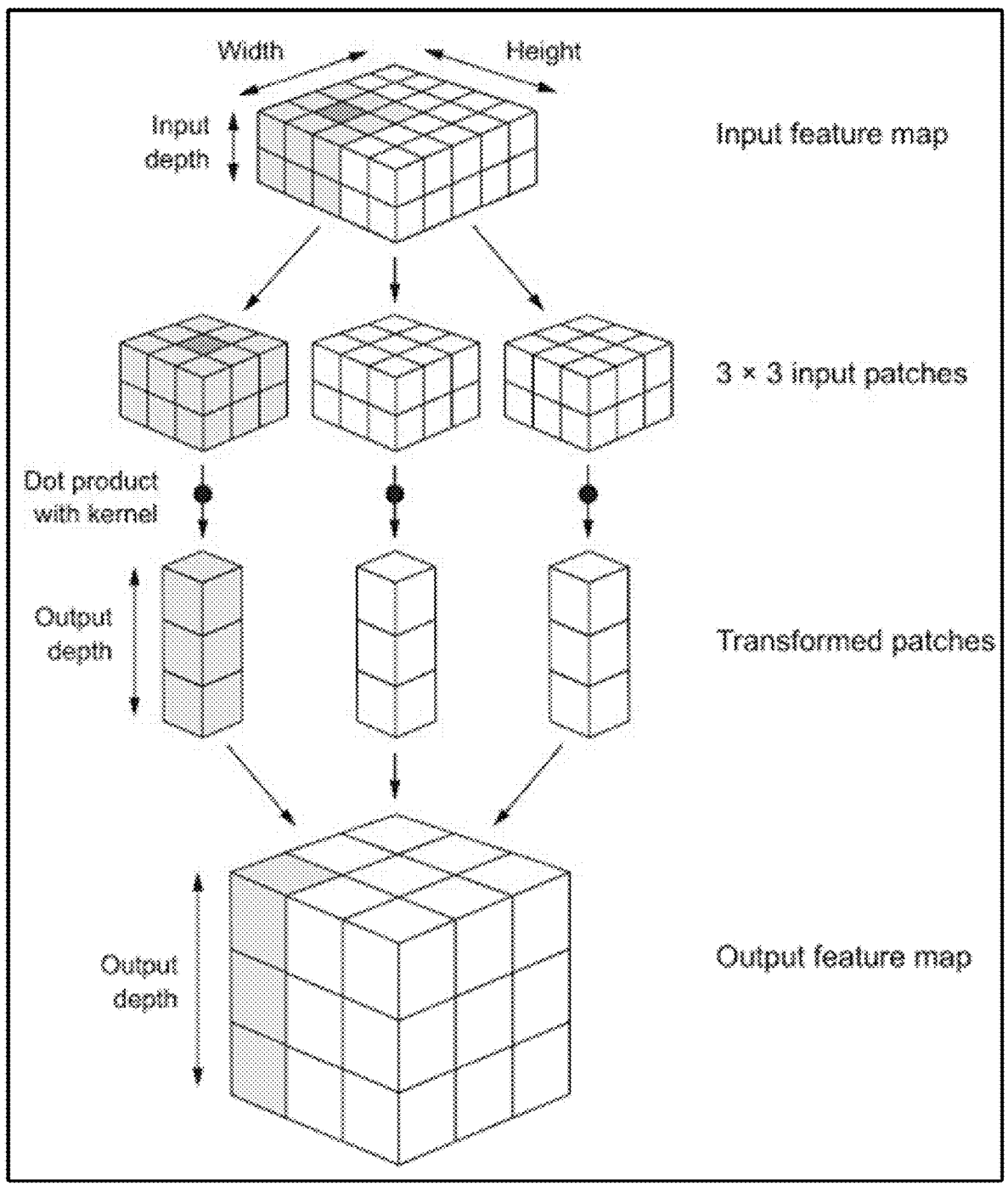
FIG. 11 illustrates an implementation of a convolutional neural network suitable for implementing the disclosed technology.

A convolution works by sliding these windows of size 3×3 or 5×5 over the 3D input feature map, stopping at every location, and extracting the 3D patch of surrounding features (shape (window_height, window_width, input_depth)). Each such 3D patch is then transformed (via a tensor product with the same learned weight matrix, called the convolution kernel) into a 1D vector of shape (output_depth). All of these vectors are then spatially reassembled into a 3D output map of shape (height, width, output_depth). Every spatial location in the output feature map corresponds to the same location in the input feature map (for example, the lower-right corner of the output contains information about the lower-right corner of the input). For instance, with 3×3 windows, the vector output [i, j, :] comes from the 3D patch input [i−1: i+1, j−1:J+1, :]. The full process is detailed in FIG. 11, illustrating an implementation of a convolutional neural network suitable for implementing the disclosed technology.

The convolutional neural network comprises convolution layers which perform the convolution operation between the input values and convolution filters (matrix of weights) that are learned over many gradient update iterations during the training. Let (m,n) be the filter size and W be the matrix of weights, then a convolution layer performs a convolution of the W with the input X by calculating the dot product W·x+b, where x is an instance of X and b is the bias. The step size by which the convolution filters slide across the input is called the stride, and the filter area (m×n) is called the receptive field. A same convolution filter is applied across different positions of the input, which reduces the number of weights learned. It also allows location invariant learning, i.e., if an important pattern exists in the input, the convolution filters learn it no matter where it is in the sequence.

Training a Convolutional Neural Network

Figure 12:
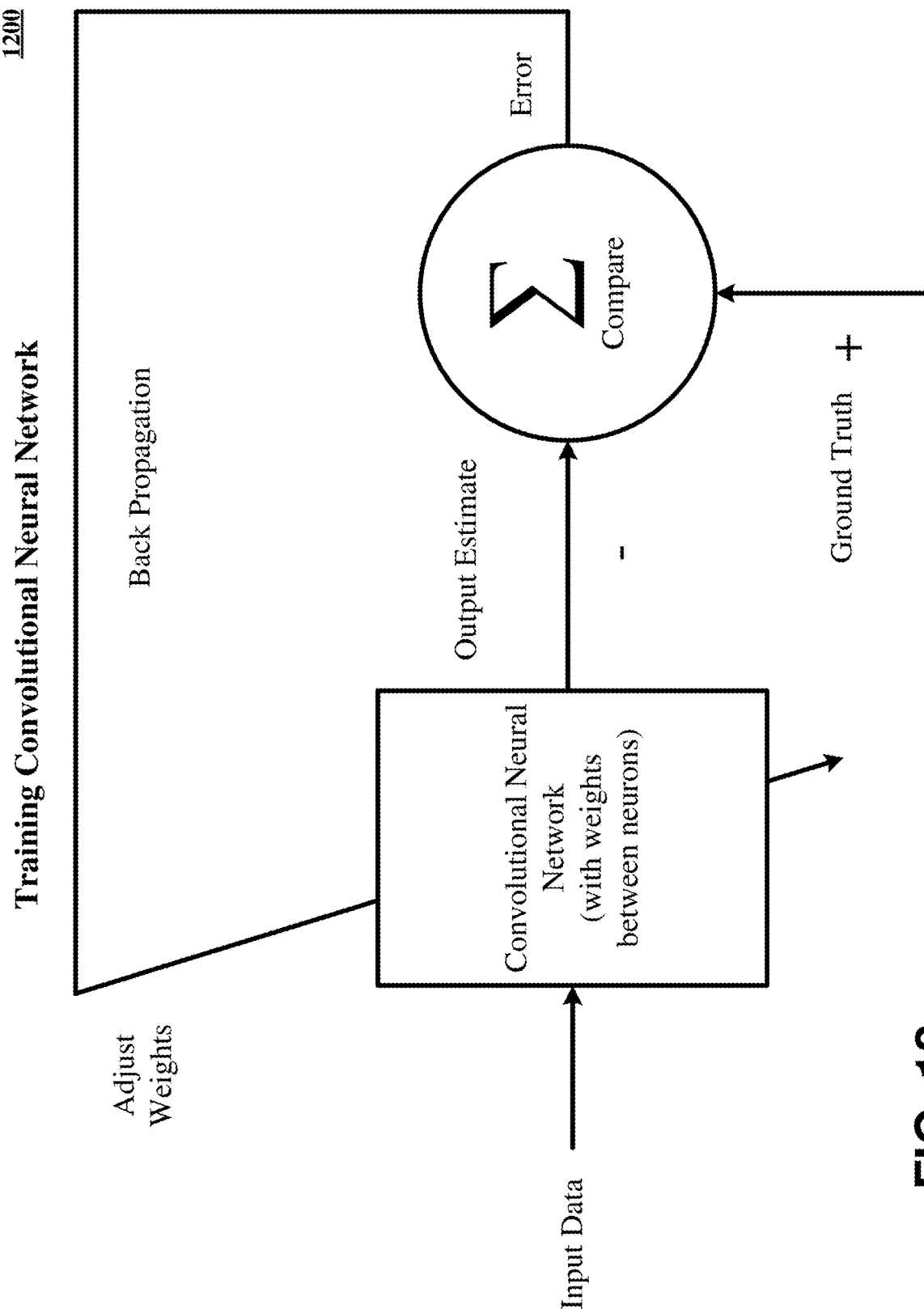
FIG. 12 depicts a block diagram of training a convolutional neural network in accordance with one implementation of the technology disclosed.

FIG. 12 depicts a block diagram of training a convolutional neural network in accordance with one implementation of the technology disclosed. The convolutional neural network is adjusted or trained so that the input data leads to a specific output estimate. The convolutional neural network is adjusted using back propagation based on a comparison of the output estimate and the ground truth until the output estimate progressively matches or approaches the ground truth.

The convolutional neural network is trained by adjusting the weights between the neurons based on the difference between the ground truth and the actual output. This is mathematically described as:

$$\Delta w_i = x_i \delta$$

where $\delta = (\text{ground truth}) - (\text{actual output})$

In one implementation, the training rule is defined as:

$$w_{nm} \leftarrow w_{nm} + \alpha(t_m - \varphi_m)a_n$$

In the equation above: the arrow indicates an update of the value; $t_m$ is the target value of neuron m; $\varphi_m$ is the computed current output of neuron m; $a_n$ is input n; and $\alpha$ is the learning rate.

The intermediary step in the training includes generating a feature vector from the input data using the convolution layers. The gradient with respect to the weights in each layer, starting at the output, is calculated. This is referred to as the backward pass, or going backwards. The weights in the network are updated using a combination of the negative gradient and previous weights.

In one implementation, the convolutional neural network uses a stochastic gradient update algorithm (such as ADAM) that performs backward propagation of errors by means of gradient descent. One example of a sigmoid function based back propagation algorithm is described below:

$$\varphi = f(h) = \frac{1}{1 + e^{-h}}$$

In the sigmoid function above, h is the weighted sum computed by a neuron. The sigmoid function has the following derivative:

$$\frac{\partial \varphi}{\partial h} = \varphi(1 - \varphi)$$

The algorithm includes computing the activation of all neurons in the network, yielding an output for the forward pass. The activation of neuron m in the hidden layers is described as:

$$\varphi_m = \frac{1}{1 + e^{-hm}}$$

$$h_m = \sum_{n=1}^{N} a_n W_{nm}$$

This is done for all the hidden layers to get the activation described as:

$$\varphi_k = \frac{1}{1 + e^{hk}}$$

$$h_k = \sum_{m=1}^{M} \varphi_m v_{mk}$$

Then, the error and the correct weights are calculated per layer. The error at the output is computed as:

$$\delta_{ok} = (t_k - \varphi_k)\varphi_k(1 - \varphi_k)$$

The error in the hidden layers is calculated as:

$$\delta_{hm} = \varphi_m(1 - \varphi_m) \sum_{k=1}^{K} v_{mk}\delta_{ok}$$

The weights of the output layer are updated as:

$$v_{mk} \leftarrow v_{mk} + \alpha \delta_{ok}\varphi_m$$

The weights of the hidden layers are updated using the learning rate $\alpha$ as:

$$v_{nm} \leftarrow w_{nm} + \alpha \delta_{hm} a_n$$

In one implementation, the convolutional neural network uses a gradient descent optimization to compute the error across all the layers. In such an optimization, for an input feature vector x and the predicted output ŷ, the loss function is defined as l for the cost of predicting ŷ when the target is y, i.e. l(ŷ,y). The predicted output ŷ is transformed from the input feature vector x using function $f$. Function $f$ is parameterized by the weights of convolutional neural network, i.e. ŷ=$f_w$(x). The loss function is described as l(ŷ,y)= l($f_w$(x),y), or Q(z,w)=l($f_w$(x),y) where z is an input and output data pair (x,y). The gradient descent optimization is performed by updating the weights according to:

$$v_{t+1} = \mu v_t - \alpha \frac{1}{n}\sum_{i=1}^{N} \nabla w_t Q(z_t, w_t)$$

$$w_{t+1} = w_t + v_{t+1}$$

In the equations above, $\alpha$ is the learning rate. Also, the loss is computed as the average over a set of n data pairs. The computation is terminated when the learning rate $\alpha$ is small enough upon linear convergence. In other implementations, the gradient is calculated using only selected data pairs fed to a Nesterov's accelerated gradient and an adaptive gradient to inject computation efficiency.

In one implementation, the convolutional neural network uses a stochastic gradient descent (SGD) to calculate the cost function. A SGD approximates the gradient with respect to the weights in the loss function by computing it from only one, randomized, data pair, Zt, described as:

$$v_{t+1} = \mu v - \alpha \nabla w Q(z_t, w_t)$$

$$w_{t+1} = w_t + v_{t+1}$$

In the equations above: $\alpha$ is the learning rate; $\mu$ is the momentum; and t is the current weight state before updating. The convergence speed of SGD is approximately O(1/t) when the learning rate $\alpha$ are reduced both fast and slow enough. In other implementations, the convolutional neural network uses different loss functions such as Euclidean loss and softmax loss. In a further implementation, an Adam stochastic optimizer is used by the convolutional neural network.

Having described neural network implementations, the discussion now turns to deep learning approaches.

Figure 13:
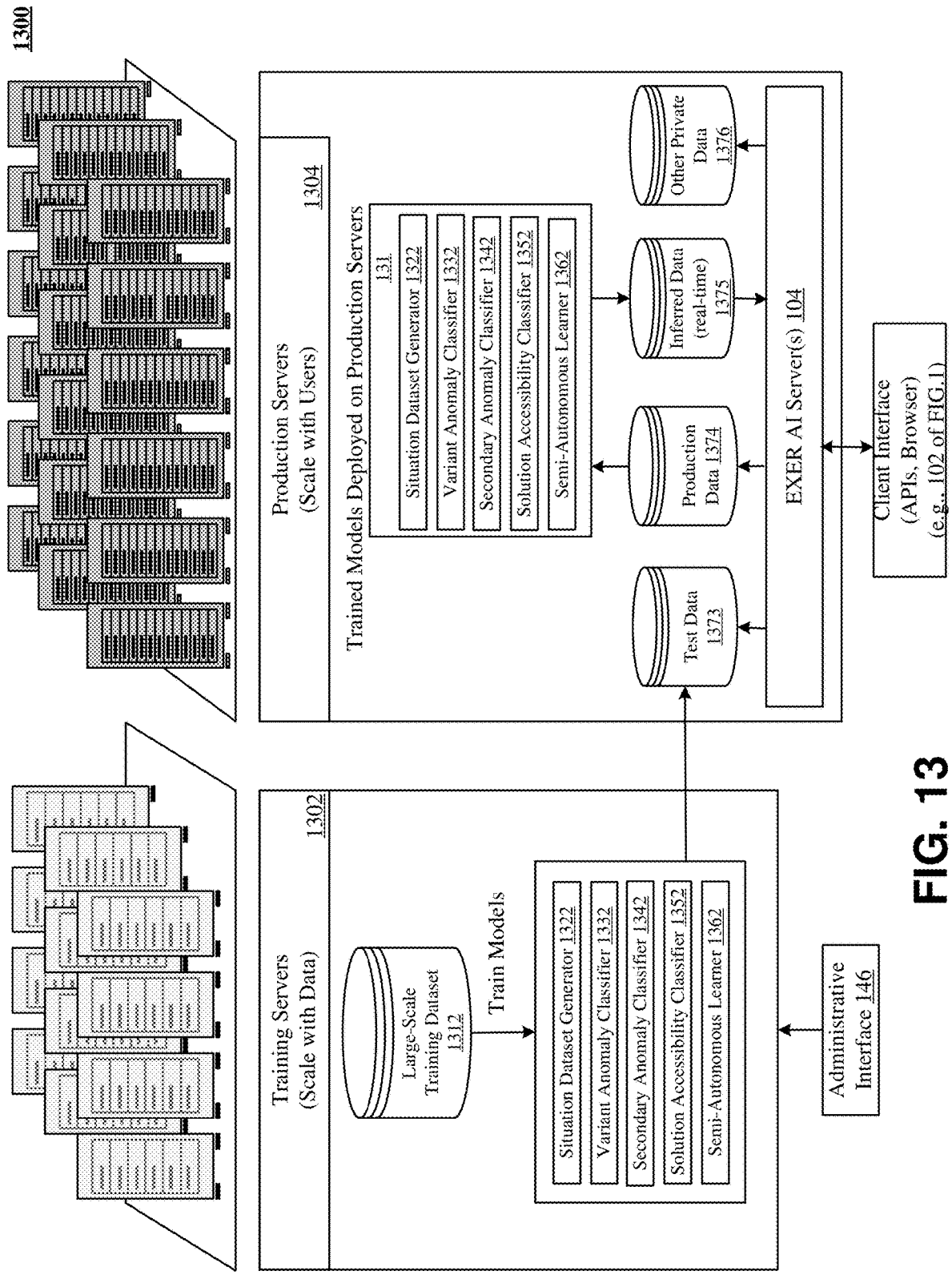
FIG. 13 illustrates a deep learning system in a supervised or semi-supervised implementation.

FIG. 13 illustrates a deep learning system in a supervised or semi-supervised implementation. As shown, deep learning system 1300 includes training servers 1302 and production servers 1304. Large scale training dataset 1312 is accessible to training servers 1302 for training the deep convolutional neural network 131. In an implementation, deep neural network 131 includes a first anomaly subnetwork, and a second solution accessibility subnetwork that are trained on one or more training servers 1302. The trained deep neural network ensemble including the first trained anomaly subnetwork, and the trained second solution accessibility subnetwork are deployed on one or more production servers 1304 that receive input anomaly information from requesting client devices 102. The production servers 1304 process the input anomaly information through at least one of the deep neural network 131, the first anomaly subnetwork, and the second solution accessibility subnetwork to produce outputs that are transmitted to the client devices 102.

Training servers 1302 conduct training using models and comprise a situation dataset generator 1322 includes a deep convolutional neural network based variant anomaly classifier, running on numerous processors coupled to memory that prepares training sets comprising data chosen from large scale training dataset 1312 to reflect one or more scenarios being trained, a variant anomaly classifier 1332 includes a deep convolutional neural network based variant anomaly classifier, running on numerous processors coupled to memory that is trained to recognize anomalous situations from sensed data using the scenarios prepared, an optional secondary classifier 1342 includes a deep convolutional neural network based secondary anomaly classifier, running on numerous processors coupled to memory that is trained to recognize special situation anomalies (e.g., radioactive spill, biohazard, etc.), a solution accessibility classifier 1352 includes a deep convolutional neural network based secondary anomaly classifier, running on numerous processors coupled to memory that is trained to recognize anomalies and output identifiers identifying remedial applications that are invoked to trigger remedial actions. A semi-autonomous learner 1362 includes a deep convolutional neural network based variant anomaly classifier, running on numerous processors coupled to memory that progressively augments a set size of the anomaly training set based on the trained ensemble's evaluation of a synthetic set or in implementations, input of live data from a real world scenario.

In one implementation, the neural networks such as situation dataset generator, variant anomaly classifier, secondary anomaly classifier, solution accessibility classifier, and semi-autonomous learner are communicably linked to the storage subsystem comprised of test data database 1373, production data database 1374, inferred data database 1375 and other private data database 1376 and user interface input devices.

In one implementation, data used in one or more of large scale training dataset 1312, test data database 1373, production data database 1374, inferred data database 1375 and other private data database 376 is selectively obtained from multiple sources of data: (i) various drug databases (e.g., the FDA Product-Specific Guidance database, which enables searching and clustering by active ingredient(s)) and communications including machine reading of emails on recalls minimizes the need to change notification protocols that can be related to machine-readable data and image recognition (e.g. images of pills) and (ii) user responses to deep learning driven follow-up questions selected by the solution accessibility classifier 1352 and semi-autonomous learner 1362 (allowing for live training and refinement).

Grid Search:

Hyperparameters

Hyperparameters are model configuration parameters that determine neural network structure as well as how the network is trained. Common examples of hyperparameters are "learning rate", or how quickly the model is adapted to the input problem, and "batch size", or how many pieces of training data are fed into the model at each training step. These parameters are set before training occurs.

Accuracy

After training completes, a model is assessed to see how well it completes its given task using various metrics including accuracy. Accuracy is simply the fraction of predictions the model correctly labeled.

$$\text{Accuracy} = \frac{\text{Number of correct predictions}}{\text{Total number of predictions}}$$

If a model's accuracy is not within acceptable range (i.e. it is not performing the given task successfully), we can adjust the hyperparameters, retrain a new model, and then assess the new model's performance.

Optimizing Hyperparameters

Tuning, or optimizing hyperparameters, is a complex problem aims to identify the optimal collection of parameters for a given model or algorithm. Grid Search is a common technique that performs an exhaustive search of given parameters to determine which collection of parameters results in the best performance of the model or algorithm.

How we Use Grid Search

FIG. 14A illustrates an example iterative machine learning process such as a grid search in a representative implementation. Consider a collection of labeled video frames for 1000 videos 1402 where we have stored the upper and lower bounds for four features: f1, f2, f3, f4 as well as whether or not the poses in the frame is considered in a given checkpoint.

Training a Model

We can use many different models and algorithms to train a classifier that, given a collection of the features f1, f2, f3, and f4, can predict whether or not the given frame is in a given checkpoint.

Now with reference to FIG. 14B, showing use of a simple example 1412 of a C-Support Vector Classification (SVC) provided by the machine learning toolkit Sklearn. In alternative implementations, many other algorithm(s) or deep learning model(s) that we create or that is provided by an existing deep learning library can be used.

Improving the Model

With continuing reference to FIG. 14B, a first iteration of training a model has resulting in an accuracy 1414 of only 70%. This low accuracy would be experienced during the training pipeline and would result in an evaluation of a test video not being properly labeled as in a checkpoint or not.

Now with reference to FIG. 14C, showing performing a Grid Search 1422 to determine new hyperparameters for the given model (in this case an SVC). This will use our existing labeled data that the system has ingested; no new data are added.

Finished

We now have a model that is 98% accurate (e.g., 1424). This new, improved accuracy improves the chance that a given test frame is accurately labeled, which would allow the system to proceed with its automatic generation of assessment rules for assessing a given exercise.

Other Particular Implementations

In an aspect of the present technology a method of conducting evaluation of collected facts about performance of a task and determining output instructions for a user performing the task is described that includes receiving state information comprising a set of collected facts describing a user pose state, including (i) at least one static fact that is constant over a time-period in which at least the task is performed and (ii) at least one dynamic fact based on an amount of time that has elapsed since a last error was detected. Upon lapse of a periodic timer, the method includes in a first process of evaluating facts in the set of collected facts as received to determine a response message to be output as instructions for performing the task, by weighting at least some facts with dynamic weightings; selecting based on the at least some facts as dynamically weighted, a response message to be output; and performing the output response message as selected, and capturing results for evaluation as historical outcomes. The method further includes in a second process, evaluating by a feedback engine historical outcomes, wherein an outcome is a consequence of a combination of facts evaluated and response message(s) played to the user, of a sample set of previous outcomes, thereby identifying a time between similar outcomes; and applying a machine learning process to the time between similar outcomes to obtain an improved selection of response messages to obtain similar outcomes exhibiting a desired result. The method further includes storing dynamic weights in a database to personalize task performance training to the user thereby bringing about desired outcome for that user.

In another aspect of the present technology, whenever the user is in an improper position as determined using information from a pose engine, state information received can further includes a label of error to present to the user wherein each label of error comprises one or more audio, video or other output-type files from which feedback is selected for output to the user while being assessed on a movement.

In further aspects, dynamic facts are selected from a set including at least (i) an amount of time that has elapsed since a last error was observed, (ii) a repetition or timestamp since an event or a timer started or a time since midnight selected from a number of times an error has been previously observed. Constant facts are quantities determinable at session start of the time period in which the task is to be performed selected from a set including at least (i) a length of a session in which tasks are to be performed, (ii) number of tasks to be performed, (iii) data collected and feedback given, and (iv) other quantities capable of being held constant during a session.

In a yet further aspect of the present technology, duration of the timer is variable and dependent on an action type of the task to be performed, in a range of 0.85 seconds corresponding to higher repletion rate actions to 5 minutes corresponding to lower repetition rate actions.

In a still further aspects of the present technology, selecting feedback can be probabilistic. Weight(s) can be applied to one or more dynamic features such that output of the fact will be true if (i) the fact is true, and then (ii) if an evenly distributed random variable with value in a range of 0 to 1 is greater than or equal to the weight, thereby enabling varying feedback selected for a particular fact. At the beginning of a session setting dynamic weights are to random values if there is no historical values for the weight values. Determining an appropriate response message type using the weighted dynamic features, including: (i) none when none exists, (ii) selecting an output message based upon output type in a set of at least audio message, visual message, and (iii) when for each message type, there exist multiple variants of recorded responses from which to choose selecting based upon message type in a set of at least specific message—too high, specific message—encouragement, specific message—warning, and specific message—termination message. Output can be automatically selected audio output response message having the response message type as determined. Initially, an audio output can be chosen at random and playing the audio output as chosen to the user and storing a time at which the audio was played and a corresponding message for future reference.

In a still yet further aspect of the present technology, applying a machine learning process can include evaluating time between two errors reported to the user by fitting a curve to data points representing previous results for the user; and applying association rules and linear regression to maximize time/reps between errors, using gradient descent, variable times, max time between consecutive errors to provide coaching to a user.

In a still yet further aspect of the present technology, historical data from a plurality (e.g., 10 or more) of previous sessions can be used to adjust the dynamic weights; and the dynamic weights as adjusted can be stored to be used in subsequent executions of the method. Dynamic weights can be stored on a device of the user, when protecting user privacy is a concern. For example, a probability of a particular type of response to a message is used to weigh future selections of responses. The probability of a particular type of response can be one of a set comprising: an error every time, a person responds to the message with a successful outcome, a person does not respond well to the message or the message appears to have no effect on the person's performance of the task. The probability of a particular type of response is one of a set task related facts comprising: resistance, repetitions, format (e.g., Tabata, as many repetitions as possible, drop-set, superset, etc.) or other factors characterizing performance of the task.

In an aspect of the present technology a method of performing video analysis includes capturing a live-stream or recorded video in color or B&W format. Scaling frames to appropriate size for model input is also part of the method. The method also includes extracting a plurality of keypoints that describe areas of interest on the body (e.g., a location of a keypoint corresponding to the user's head is found to be at (x: 200, y: 300)). Implementations of the method also call for smoothing the current pose using an appropriate digital signal processing (DSP) functionality to prevent perceived jumpiness in the video image when displayed, especially when using a mobile or small footprint device. Given a current exercise being taught, the method further calls for extracting features from the relevant assessment rules, and comparing the current set of keypoints as extracted to features extracted from the relevant assessment rules to determine a current state of the user's pose. Given the determined state, the method includes identifying a message (or NULL message) to present or play for the user.

Other implementations may include a non-transitory computer readable storage medium storing instructions executable by a processor to perform actions of the system described above. Yet another implementation may include a method performing actions of the system described above.

This system implementation and other systems disclosed optionally include one or more of the foregoing features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

Other implementations may include a non-transitory computer readable storage medium storing instructions executable by a processor to perform actions of the system described above. Each of the features discussed in the particular implementation section for other implementations apply equally to this implementation. As indicated above, all the other features are not repeated here and should be considered repeated by reference.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of automated determination of a base assessment for a pose or movement, the method comprising:
   performing video analysis, including:
     obtaining a manifest and corresponding recorded videos of individuals performing particular movements in proper states ("correct form") and in improper states ("incorrect form");
     extracting one or more portions of the corresponding recorded videos for evaluation, while maintaining any descriptions from the manifest for at least one frame of a plurality of frames of the one or more portions extracted from the corresponding recorded videos;
inputting, one frame at a time, into a pose estimation neural network, the one or more portions extracted from the corresponding recorded videos;
receiving, as an output of the pose estimation neural network and for each input frame, a pose comprising a collection of keypoints captured in the input frame, the keypoints corresponding to body parts, including (i) coordinates of one or more keypoints in the input frame and (ii) confidences for each keypoint representing a probability that the keypoint is a particular feature of each of a body portion subject to evaluation; and
outputting one or more labeled payloads of poses and confidences for each frame of the one or more portions extracted from the corresponding recorded videos, wherein a labeled payload indicates (i) whether a video slice depicts a body that is in a correct form or an incorrect form, (ii) keypoint information and (iii) confidence information;
performing movement analysis, including:
identifying a selection of a particular movement to train, a video associated with the particular movement and a corresponding manifest;
examining the corresponding manifest to identify candidate body features and automatically selecting from the candidate body features, relevant body features to serve as keypoints;
for each pose and confidence in the one or more labeled payloads, extracting the relevant body features;
using the manifest, extracting checkpoints comprising the relevant body features across one or more input videos;
determining for each of the relevant body features identified, a relevant range of values; and
providing recommendations including ranges for relevant body features that are acceptable for the particular movement, thereby enabling a model to be fit to the movements in the video within the relevant range of values;
performing model fitting to determine keypoints and body features relevant to classifying poses as correct form or incorrect form, including:
performing body feature extraction for a video using the poses and confidences obtained; and
for each labelled checkpoint, estimating whether a pose at the checkpoint is proper or improper; and whenever the checkpoint was mislabeled in an estimate that the pose at the checkpoint is improper, then applying an iterative machine learning process to adjust ranges of the body features until each checkpoint is identified properly, thereby resulting in the estimate matching the manifest; and
storing a base assessment for the particular movement in a database once the poses at all of the checkpoints are identified correctly, wherein the base assessment includes identified baselines for best case scenarios for each pose/movement.

2. The method of claim 1, wherein video analysis further includes labeling a payload indicating (i) that a particular frame includes a particular pose, and poses of each keypoint, (ii) confidences of each keypoints, and (iii) an aggregate of confidences over multiple keypoints for a particular repetition of a movement.

3. The method of claim 1, wherein video analysis further includes using one or more confidences to weight some keypoints assigned to joints, thereby enabling confidences of a first keypoint associated with a first joint permeate through labeling of other keypoints associated with other joints and across collections of frames.

4. The method of claim 1, wherein body features are selected from a set of at least a neck length, a shoulder angle, and a knee angle.

5. The method of claim 1, wherein model fitting further includes;
rerunning the performing body feature extraction after a range is changed;
determining whether the change improved or degraded overall accuracy based upon at least whether number of mislabeled checkpoints increased or decreased; and
adjusting ranges until all checkpoints are identified correctly.

6. The method of claim 1, wherein videos that are self-created are labelled whereas videos received from other sources may or may not be labelled.

7. The method of claim 1, wherein the manifest describes frames of each video as being at least one of (i) proper, reflecting that an individual is in a proper state, and (ii) improper, reflecting that an individual is in an improper state.

8. The method of claim 1, wherein the manifest further describes the plurality of frames of each video as (i) being a start of a repetition, (ii) being an end of a repetition, (iii) including specific keypoints to be evaluated and (iv) including a working side to be evaluated.

9. The method of claim 8, wherein keypoints to be evaluated are associated with at least one of a set comprising a head, a shoulder, an elbow, a knee, a foot, or any other body feature.

10. The method of claim 1, wherein the manifest identifies a plurality of peak checkpoints to be evaluated per repetition as an individual's body moves through repetitions, during a repetition the individual's body moves through a series of these checkpoints.

11. The method of claim 10, wherein peak check points include at least one of a set comprising an initial checkpoint and a motion-peak checkpoint.

12. The method of claim 11, wherein the motion-peak check is a stopping point in a motion.

13. The method of claim 10, wherein a checkpoint includes a set of keypoints in a known state as a body moves through a series of checkpoints throughout a repetition.

14. The method of claim 13, wherein keypoints in a squat include a bottom of squat, certain angles of knees, an angle formed by shoulders, an angle formed at a waist.

15. The method of claim 1, further including performing customization, including:
receiving from a coach user, one or more adjustments to determined features using a web GUI;
determining, by a customization engine, a difference between baseline values and a coach user's version of the base assessment determined using the adjustments as received;
extracting from the labeled payloads of poses and confidences, a set of features;
comparing set of features as extracted from the labeled payloads of poses and confidences against new values determined using the adjustments as received, thereby determining a difference between adjusted values and the identified baseline, if a range is determined to no longer identify one or more movement checkpoints, reporting an error alerting that a modified value would not meet a checkpoint in the identified baseline and providing the coach user an opportunity to re-adjust the values and retry; and if it is found that all ranges can still properly identify the one or more labeled checkpoints in the video, finishing the customization and storing a coach assessment in a database for future use.

16. The method of claim 2, further including transmitting the payload to a user device, the user device conducting evaluation of collected facts about performance of a task and determining output instructions for a user performing the task, including:

receiving state information comprising a set of collected facts describing a user pose state, including (i) at least one static fact that is constant over a time-period in which at least the task is performed and (ii) at least one dynamic fact based on an amount of time that has elapsed since a last error was detected;

upon lapse of a periodic timer, in a first process:
evaluating facts in the set of collected facts as received to determine a response message to be output as instructions for performing the task, by weighting at least some facts in the set of collected facts with dynamic weightings;
selecting based on the at least some weighted facts, a response message to be output; and
performing the response message as selected, and capturing results for evaluation as historical outcomes; and in a second process:
evaluating by a feedback engine historical outcomes, wherein an outcome is a consequence of a combination of facts evaluated and response message(s) played to the user, of a sample set of previous outcomes, thereby identifying a time between similar outcomes; and
applying a machine learning process to the time between similar outcomes to obtain an improved selection of response messages to obtain similar outcomes exhibiting a desired result; and storing in a database, one or more dynamic weightings to personalize task performance training to the user thereby bringing about desired outcome for that user.

17. A system comprising:
a memory for storing instructions; and
a processor, coupled with the memory and to execute instructions stored thereon, which instructions, when executed cause the processor to perform the method of claim 1.

18. A non-transitory computer readable medium comprising stored instructions, which when executed by a processor, cause the processor to perform the method of claim 1.

19. A method of automated determination of a base assessment for a pose or movement, the method comprising:
performing video analysis, including:
obtaining a manifest and corresponding recorded videos of individuals performing particular movements in proper states (correct form) and in improper states (incorrect form),
wherein the corresponding recorded videos that are self-created are labelled or videos found from other sources that may or may not be labelled,
wherein the manifest describes a plurality of frames of each video as being at least one of (i) proper, reflecting that an individual is in a proper state, or (ii) improper, reflecting that an individual is in an improper state,
wherein the manifest further describes the plurality of frames of each video as (i) being a start of a repetition, (ii) being an end of a repetition, (iii) including specific keypoints comprising at least one of head, shoulder, knee, and elbow, to be evaluated and (iv) including a working side to be evaluated,
wherein the manifest identifies a number of peak checkpoints to be evaluated per repetition including at least an initial checkpoint and a peak checkpoint based upon a position of a motion as an individual's body moves through repetitions,
wherein during a repetition the individual's body moves through a series of these checkpoints,
wherein a difference between a keypoint and coordinates thereof and checkpoint is that checkpoints include collection of keypoints in a known state including at least one of keypoints in an identified position in a movement, certain angles of one or more of knees, shoulders, or waist, as the individual's body moves through a series of checkpoints throughout a repetition,
wherein the manifest can include information indicating, in a range of time from 2 to 6 seconds or from frames in a range of from 60 to 360 frames that position of a particular body part of an individual is within or outside of a tolerance,
extracting portions of the videos for evaluation, while maintaining any descriptions in the manifest of the frames of the extracted portions of the videos;
inputting, one frame at a time, into a pose estimation neural network, the extracted portions of the videos;
receiving, as an output of the pose estimation neural network and for each input frame, a pose comprising a collection of the keypoints in the frame, including (i) coordinates of one or more keypoints in the frame and (ii) confidences representing a confidence that each keypoint is a particular feature of a body portion subject to evaluation; and
outputting one or more labeled payloads of poses and confidences for each frame of the one or more portions extracted from the corresponding recorded videos,
wherein a labeled payload can indicate (i) that this frame includes a pose of someone leaning over, and poses of the keypoints, (ii) the confidences of the keypoints, and (iii) an aggregate of confidences over all keypoints for a particular repetition,
wherein one or more confidences used to weight some keypoints, permeate through labeling of at least one other of the keypoints and across collections of frames,
whenever the labels in the manifest are wrong, reconciling and validating the labels that were so determined,
thereby for slices of videos, providing in the labeled payloads, information indicating (i) whether the individual's body is in a correct position/state or an incorrect position/state, (ii) keypoint information and (iii) confidence information;

performing movement analysis, including:
  identifying or selecting a particular movement;
  identifying or selecting a video associated with particular movement, and a corresponding manifest;
  examining the corresponding manifest of the associated video to determine a candidate list of body features,
    wherein, a body feature includes an angle between a first body part and a second body part that is determined using keypoints that can be used to evaluate the particular movement,
    wherein the body feature can be derived from the keypoints and relationships, including distances, and angles therebetween;
  automatically selecting, from the candidate list of body features, body features including one or more of at least a neck length, a shoulder angle, and a body measurement, and that are in the candidate list of body features and related to the keypoints;
  for each pose and confidence in the labeled payload, extracting one or more relevant body features;
  using the manifests, extracting checkpoints across each input video;
  determining from the candidate list of body features, relevant ranges of values for each identified body feature of the one or more relevant body features, thereby resulting in a list having form: "checkpoint initial", "checkpoint repetition" and "checkpoint [error—hips too high] _state" for each video or portion thereof, and
  providing recommendations including (i) ranges for particular body features that are acceptable for a particular movement, for model fitting along with the manifest, poses and confidences for each video,
    thereby forming a collection of ranges from minimum to maximum that are essentially acceptable for the particular movement;
  performing model fitting to determine which keypoints and/or body features are relevant to determining whether a particular posture is correct, including:
    performing body feature extraction for a video using the poses and confidences obtained, whereby at each labeled checkpoint of one or more labeled checkpoints in the poses-and-confidences video, recommendations are compared to determine if the checkpoint is being modelled properly,
    whereby, data used to make a first estimate is available, thereby enabling for each frame, determining an estimate whether the pose at the checkpoint is proper or improper;
    if all checkpoints are identified correctly based on the estimate, then the performing of the model fitting is complete;
    if any checkpoints were mislabeled based on estimating that the pose at the checkpoint is improper, then an iterative machine learning process, including a grid search, is performed to adjust ranges of the body features until each of the checkpoints is identified properly, whereby the estimate resulting matches the manifest,
      after a range is changed, the performing of the body feature extraction from above is reran to see if the change improved or degraded overall accuracy, then the ranges are adjusted until all checkpoints are identified correctly; and
    storing a base assessment for the particular movement in a database once the performing of the model fitting has determined that the poses at all of the checkpoints are identified correctly, the base assessment includes identified baselines for best case scenarios for each pose/movement.

20. The method of claim 15, wherein movement checkpoints outside of a range are displayed in red by a graphical user interface (GUI) and movement checkpoints within a range are displayed in green.

\* \* \* \* \*